US012159745B2

(12) United States Patent
Long et al.

(10) Patent No.: US 12,159,745 B2
(45) Date of Patent: Dec. 3, 2024

(54) WIRELESS POWER TRANSFER THIN PROFILE COIL ASSEMBLY

(71) Applicant: Momentum Dynamics Corporation, Malvern, PA (US)

(72) Inventors: Bruce Richard Long, Malvern, PA (US); Andrew W. Daga, Malvern, PA (US); John M. Wolgemuth, Horsham, PA (US); Peter C. Schrafel, Philadelphia, PA (US); Benjamin H. Cohen, Malvern, PA (US); Moses M. Keener, Philadelphia, PA (US); Francis J. McMahon, Malvern, PA (US)

(73) Assignee: InductEV, Inc., King of Prussia, PA (US)

( * ) Notice: Subject to any disclaimer, the term of this patent is extended or adjusted under 35 U.S.C. 154(b) by 708 days.

(21) Appl. No.: 16/615,290

(22) PCT Filed: May 30, 2018

(86) PCT No.: PCT/US2018/035060
§ 371 (c)(1),
(2) Date: Nov. 20, 2019

(87) PCT Pub. No.: WO2018/222669
PCT Pub. Date: Dec. 6, 2018

(65) Prior Publication Data
US 2020/0168393 A1    May 28, 2020

Related U.S. Application Data

(60) Provisional application No. 62/512,544, filed on May 30, 2017.

(51) Int. Cl.
*H01F 27/28* (2006.01)
*H01F 27/36* (2006.01)
(Continued)

(52) U.S. Cl.
CPC ......... *H01F 38/14* (2013.01); *H01F 27/2804* (2013.01); *H01F 27/36* (2013.01);
(Continued)

(58) Field of Classification Search
CPC ...... H01F 38/14; H01F 27/2804; H01F 27/36; H01F 27/363; H01F 27/402;
(Continued)

(56) References Cited

U.S. PATENT DOCUMENTS 9,236,171 B2    1/2016  Ito et al.
9,843,216 B2    12/2017 Ookawa et al.
(Continued)

FOREIGN PATENT DOCUMENTS

CN    110999028    4/2020
EP    3016231 B1    9/2017
(Continued)

OTHER PUBLICATIONS

European Application No. 18810537.3, Extended European Search Report dated May 4, 2021, 11 pages.
(Continued)

*Primary Examiner* — Mang Tin Bik Lian
(74) *Attorney, Agent, or Firm* — Michael P. Dunnam; Culhane Meadows PLLC

(57) ABSTRACT

A thin resonant induction wireless power transmission transfer coil assembly designed for low loss and ease of manufacturing includes one or more printed circuit boards having a first conductor pattern wound in a spiral on a first side and a second conductor pattern wound in a spiral on a second side thereof, where the second conductor pattern is aligned with the first conductor pattern whereby the second conductor pattern reinforces magnetic flux generated by the first conductor pattern. The first and second conductor patterns are placed relative to one another so as to provide flux (Continued)

transmission in a same direction. One or more of such printed circuit boards form a wireless power transmission coil assembly with a conductive winding layer, a ferrite flux diversion layer, conformal spacing layers, an eddy current shield layer and an assembly enclosure.

20 Claims, 15 Drawing Sheets

(51) Int. Cl.
    *H01F 27/40*      (2006.01)
    *H01F 38/14*      (2006.01)
    *H02J 50/12*      (2016.01)
    *H01F 27/34*      (2006.01)

(52) U.S. Cl.
    CPC ......... *H01F 27/363* (2020.08); *H01F 27/402* (2013.01); *H02J 50/12* (2016.02); *H01F 2027/2809* (2013.01); *H01F 2027/348* (2013.01)

(58) Field of Classification Search
    CPC ....... H01F 2027/2809; H01F 2027/348; H01F 5/003; H01F 27/2847; H01F 27/366; H01F 27/2871; H01F 27/361; H02J 50/12; H04B 5/0037
    See application file for complete search history.

(56) References Cited

U.S. PATENT DOCUMENTS

| | | |
|---|---|---|
| 9,931,952 B2 | 4/2018 | Tripathi et al. |
| 10,158,256 B2 | 12/2018 | Asanuma et al. |
| 10,573,445 B2 | 2/2020 | Covic et al. |
| 10,658,740 B2 | 5/2020 | Noh et al. |
| 2003/0161086 A1 | 8/2003 | Anthony |
| 2009/0085706 A1 | 4/2009 | Baarman et al. |
| 2010/0261038 A1 | 10/2010 | Imaoka et al. |
| 2011/0198940 A1* | 8/2011 | Urano ............... H04B 5/0037 307/104 |
| 2012/0057322 A1* | 3/2012 | Waffenschmidt ..... H02J 50/005 361/816 |
| 2012/0092222 A1* | 4/2012 | Kato ................ H01Q 7/00 343/742 |
| 2012/0212069 A1* | 8/2012 | Kawano ............ H02J 50/90 307/104 |
| 2012/0248882 A1* | 10/2012 | Urano .............. H01F 38/14 307/104 |
| 2012/0256585 A1* | 10/2012 | Partovi ............. H02J 50/12 320/108 |
| 2012/0274148 A1* | 11/2012 | Sung ................ H02J 50/10 307/104 |
| 2013/0088090 A1* | 4/2013 | Wu ................. H01F 3/08 336/84 R |
| 2013/0181668 A1 | 7/2013 | Tabata et al. |
| 2013/0222101 A1 | 8/2013 | Ito et al. |
| 2013/0249303 A1* | 9/2013 | Keeling ............. H02J 50/80 307/104 |
| 2013/0257362 A1* | 10/2013 | Lim ................ H01F 38/14 361/752 |
| 2014/0002015 A1 | 1/2014 | Tripathi et al. |
| 2014/0177197 A1 | 6/2014 | Lampinen |
| 2014/0197694 A1 | 7/2014 | Asanuma et al. |
| 2015/0061591 A1 | 3/2015 | Armstrong et al. |
| 2015/0077208 A1 | 3/2015 | Goldman et al. |
| 2016/0064814 A1* | 3/2016 | Jang ................ H01Q 7/04 174/377 |
| 2016/0094082 A1 | 3/2016 | Ookawa et al. |
| 2016/0121731 A1* | 5/2016 | Matsumoto ........ H02J 50/005 307/104 |
| 2016/0204618 A1* | 7/2016 | Samuelsson ......... H01F 38/14 307/104 |
| 2016/0276079 A1 | 9/2016 | Nishimoto et al. |
| 2017/0033954 A1 | 2/2017 | Henry et al. |
| 2017/0104358 A1* | 4/2017 | Song ................ H01F 27/08 |
| 2017/0237293 A1* | 8/2017 | Faraone ............. H02J 50/90 713/300 |
| 2017/0288469 A1* | 10/2017 | Murashige ........... H02J 50/70 |
| 2017/0345555 A1* | 11/2017 | Jang ................ B32B 15/04 |
| 2018/0114634 A1* | 4/2018 | Lin ................. H01F 38/14 |
| 2018/0205142 A1* | 7/2018 | Jung ................ H01Q 1/38 |
| 2019/0006094 A1* | 1/2019 | Furiya .............. H01F 27/06 |
| 2019/0371521 A1* | 12/2019 | Akuzawa ............ H01F 38/14 |

FOREIGN PATENT DOCUMENTS

| | | |
|---|---|---|
| JP | 2013062386 A | 4/2013 |
| JP | 2015528272 A | 9/2015 |
| JP | 2016093088 A | 5/2016 |
| JP | 2017004994 A | 1/2017 |
| JP | 2020522885 | 7/2020 |
| KR | 1020160009632 A | 1/2016 |
| KR | 1020170022421 A | 3/2017 |
| WO | 2012053439 A1 | 4/2012 |
| WO | 2013179639 A1 | 12/2013 |
| WO | 2014004551 A1 | 1/2014 |
| WO | 2015070202 A2 | 5/2015 |
| WO | WO-2018222669 A1 | 12/2018 |

OTHER PUBLICATIONS

Korean Patent Application No. 10-2019-7038173, Notice of Preliminary Rejection dated Sep. 15, 2021, 7 pages.
"International Application Serial No. PCT US2018 035060, International Preliminary Report on Patentability mailed Dec. 12, 2019", 11 pgs.
"European Application Serial No. 18810537.3, Response to Communication Pursuant to Rules 161(1) and 162 EPC filed Feb. 25, 2020", 4 pgs.
Japanese Application No. 2019-565876, "Notice of Reasons for Refusal." dated Jan. 25, 2022, 4 pages.
"International Application Serial No. PCT/US2018/035060, International Search Report mailed Aug. 27, 2018", 3 pgs.
"International Application Serial No. PCT/US2018/035060, Written Opinion mailed Aug. 27, 2018", 9 pgs.
Office Action received in Japanese Patent Application No. 2022-069788, dated Dec. 27, 2022, 5 pages.
Martin, Ferran, et al., "Introduction to Balanced Transmission Lines, Circuits, and Networks", Balanced Microwave Filters, Chapter 1, Mar. 2, 2018, 18 pages.

\* cited by examiner

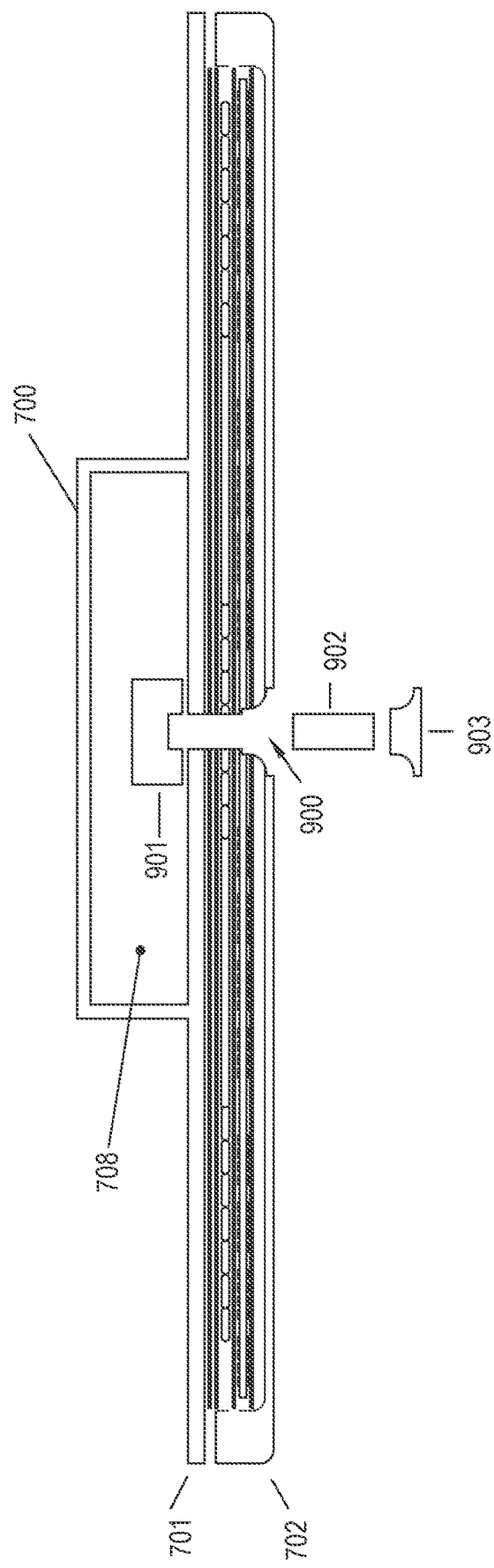

WIRELESS POWER TRANSFER THIN PROFILE COIL ASSEMBLY

CROSS-REFERENCE TO RELATED APPLICATIONS

The present application is a U.S. National Stage Application under 35 U.S.C. 371 from International Application No. PCT/US2018/035060, filed May 30, 2018 claims priority to U.S. Provisional Patent Application No. 62/512,544, filed May 30, 2017. The contents of both applications are incorporated herein by reference.

TECHNICAL FIELD

This patent application describes a wireless power transfer coil assembly as it pertains to wireless charging through use of magnetic resonant induction. The wireless power transfer coil assembly described herein can be used as part of the sending or as part of the receiving wireless power transfer apparatus.

BACKGROUND

Resonant induction wireless charging makes use of an air core transformer consisting of two concentric coils displaced along a common coil axis. Electrical power is sent from the sending apparatus to the receiving apparatus by means of magnetic flux linkage between the two transfer coils. A high frequency alternating current flowing in the primary coil induces an alternating current into the secondary coil.

As the wireless power transfer operating frequency is significantly higher than line frequency, typically 20 kHz and higher, solid wire has significantly elevated AC losses with respect to direct current due to the skin effect. In order to limit AC resistance, wireless power transfer coil conductors are typically implemented as multiple, independently insulated small diameter conductors connected in parallel, generally gathered together into a rope lay configuration. Wire of this type is referred to as Litz wire. Litz wire has a number of disadvantages in this application. Litz wire has poor utilization of cross-sectional area due to void space between the individual wires and also due to the significant portion of the cross-section occupied by individual wire insulation. The insulation and void space volumes make heat removal from the Litz bundle interior difficult. Finally, Litz wire is costly and assembly operations involving Litz wire especially wire forming and connector attachment are labor intensive.

A method of designing and constructing resonant induction transfer coils that avoids the disadvantageous use of Litz wire is desired.

SUMMARY

A resonant induction, wireless power transfer coil includes a printed circuit board backed by a layer of flux guiding ferrite magnetic material inside a weatherproof enclosure. Additional components include resonating capacitors, rectifiers and post-rectification ripple filters that are included in the weatherproof enclosure. The multiple, independent individual printed circuit board traces correspond to the multiple independent Litz wire conductors present in conventional transfer coils. Trace width is selected to minimize conductor eddy currents and proximity effects. The overall trace pattern insures current sharing among multiple traces. The resulting planar spiral inductor described herein has low AC resistance and can be easily and inexpensively manufactured as a conventional printed circuit board.

Sample embodiments include a wireless power transfer coil including a printed circuit board having a first side and a second side, a first conductor pattern comprising a first plurality of conductors wound in a spiral on the first side of the printed circuit board, and a second conductor pattern comprising a second plurality of conductors wound in a spiral on the second side of the printed circuit board, the second conductor pattern being aligned with the first conductor pattern whereby the second conductor pattern reinforces magnetic flux generated by the first conductor pattern. In sample embodiments, the first and second conductor patterns are placed relative to one another so as to provide flux transmission in a same direction. At least one electrical connection may be provided to electrically connect respective conductors of the first and second conductor patterns. The electrical connections may comprise at least one throughhole through the printed circuit board or at least one or more of a clamp, a lug, and a terminal. The throughholes may also be plated offset throughholes.

In sample embodiments, the first and second conductor patterns comprise at least 2 turns of conductor configured as a square, flat planar spiral and the first and second plurality of conductors each comprises at least two independent conductors.

The trace thickness is limited by the skin depth at the operating frequency as it contributes to AC resistance. Skin depth $\delta$ at a resonant induction wireless power operating frequency is given by $\delta = \sqrt{2\sigma/\omega\mu}$ where $\sigma$ is a conductor resistivity in Ohm-Meters, $\omega$ is the operating frequency in radians per second, and $\mu$ is a magnetic permeability of the conductor.

The trace width is limited by the allowable conductor eddy currents. Eddy current losses for a conductive element in a uniform magnetic field are $$P = \frac{\pi^2 B^2 d^2 f^2}{6\rho};$$

where B is the peak magnetic field, d is the smallest dimension of the conductive element perpendicular to the magnetic field vector, f is the operating frequency in Hz, p is the resistivity of the conductive element and P is power dissipation per unit volume. Trace-to-trace spacing is minimized to manufacturing capability as voltage between traces are close to zero. Turn-to-turn proximity effects minimize trace-to-trace proximity effects. Turn-to-turn spacing is minimized to the limits allowed by turn-to-turn voltage.

The wireless power transfer coil may further include coil terminals and associated throughholes in the center of the first and second conductor patterns or at an outer edge of the first and second conductor patterns and an outer edge of the printed circuit board.

The wireless power transfer coil also may comprise a multi-layer coil stack comprising 2n layers having the first and second conductor patterns, where n is a positive integer. In a first configuration, where n=1, the multi-layer coil stack comprises a first conductor pattern providing a forward current path conductor, a second conductor pattern providing a return current path conductor, and a differential mode dielectric provided between the first conductor pattern and the second conductor pattern.

In other embodiments, where n=2, the multi-layer coil stack respectively comprises a first conductor pattern providing a forward current path conductor, a second conductor pattern providing a return current path conductor, a third conductor pattern providing a forward current path conductor, a fourth conductor pattern providing a return current path conductor, a first differential mode dielectric provided between the first conductor pattern and the second conductor pattern, a second differential mode dielectric provided between the third conductor pattern and the fourth conductor pattern, and a third differential mode dielectric provided between the second conductor pattern and the third conductor pattern.

In an alternate configuration, the multi-layer coil stack respectively comprises a first conductor pattern providing a forward current path conductor, a second conductor pattern providing a return current path conductor, a third conductor pattern providing a return current path conductor, a fourth conductor pattern providing a forward current path conductor, a first differential mode dielectric provided between the first conductor pattern and the second conductor pattern, a second differential mode dielectric provided between the third conductor pattern and the fourth conductor pattern, and a common mode dielectric provided between the second conductor pattern and the third conductor pattern.

In still another configuration, the multi-layer coil stack respectively comprises a first conductor pattern providing a forward current path conductor, a second conductor pattern providing a forward current path conductor, a third conductor pattern providing a return current path conductor, a fourth conductor pattern providing a return current path conductor, a first common mode dielectric provided between the first conductor pattern and the second conductor pattern, a second common mode dielectric provided between the third conductor pattern and the fourth conductor pattern, and a differential mode dielectric provided between the second conductor pattern and the third conductor pattern.

The multi-layer coil stack may further include terminals implemented as independent tabs offset along an edge of each printed circuit board to facilitate connection to independent terminal pairs of respective conductor patterns of each printed circuit board. Vias or terminals may also be provided to connect respective conductor patterns through a middle of the respective boards. Second terminals may also be implemented as independent tabs offset along a center of each printed circuit board to facilitate connection to independent terminal pairs of respective conductor patterns of each printed circuit board.

In other embodiments, the terminals may be implemented as independent tabs offset along a center of each printed circuit board to facilitate connection to independent terminal pairs of respective conductor patterns of each printed circuit board. In such embodiments, vias or terminals may connect respective conductor patterns through an outer edge of the respective circuit boards.

The differential mode dielectrics should be able to withstand the maximum voltage difference between conductors. In sample embodiments, the common mode dielectrics may be minimized to manufacturing tolerances because voltages across the common mode dielectrics are close to zero.

The wireless power transfer coil may be incorporated into a wireless power transfer coil assembly further including an enclosure, a ferrite layer, and an eddy current shield. In sample embodiments, the wireless power transfer coil, ferrite layer, and eddy current shield are disposed in parallel within the enclosure.

The ferrite layer may comprise a ferrite backing layer bonded to ferrite bars, tiles, or plates of constant thickness so as to hold the ferrite bars together as a single assembly wherein a tiling density of the ferrite is continuous or near continuous near a center of the wireless power transfer coil and the tiling density is reduced progressively as a perimeter of the wireless power transfer coil is approached. Alternatively, the ferrite layer may comprise a composite magnetic structure including ferrite powder combined with a binding material and injection molded to form a composite ferrite layer that is thicker at a center thereof and thinner at a perimeter thereof. On the other hand, the eddy current shield may comprise an electrically conductive sheet or a conductive film deposited on a dielectric substrate that is adapted to intercept and dissipate residual magnetic flux not diverted by the ferrite layer. The assembly may also include mechanically conformal, electrically non-conductive layers disposed between the enclosure and the wireless power transfer coil, between the wireless power transfer coil and the ferrite layer, and between the ferrite layer and the eddy current shield. These electrically non-conductive layers are adapted to provide mechanical support, heat removal, and physical spacing for the wireless power transfer coil and the ferrite layer.

In sample embodiments, the enclosure further includes an enclosed volume containing power control, communication, and/or sensor electronics. The circuitry may include resonating capacitors, power control circuitry, communications circuitry, and circuitry adapted to provide object detection functions. The resonating capacitors may be in the form of a thin, multi-layer, metalized dielectric sheet implemented as an additional layer located between the ferrite layer and the enclosure. Alternatively, the resonating capacitors may be in the form of thin, large area metalized dielectric films located on a low field intensity side of the ferrite layer.

In further sample embodiments, at least two of the wireless power transfer coils may be stacked and connected in parallel to increase winding ampacity or stacked and connected in series to increase winding inductance.

In alternative embodiments, a sensor aperture is located at a center of the wireless power transfer coil and includes sensor electronics while allowing for bi-directional passage of sensor or communications signals to/from respective sides of the wireless power transfer coil assembly. The sensor electronics may include a light pipe, acoustic waveguide, electromagnetic waveguide, or dielectric waveguide for sensing and communications. Also, in sample embodiments, the electromagnetic waveguide may have high-pass or bandpass frequency selective surfaces adapted to avoid the generation of eddy currents. In addition, the dielectric waveguide may be implemented as a single wire Goubau transmission line that is adapted to avoid eddy current generation.

In a further alternative embodiment, the printed circuit board may be replaced by a flat spiral of conductive tape having a thickness that is no thicker than four times a skin depth of the first conductor pattern at an operating frequency, where skin depth $\delta$ at a resonant induction wireless power operating frequency is given by $\delta = \sqrt{2\sigma/\omega\mu}$ where $\sigma$ is a conductor resistivity in Ohm-Meters, $\omega$ is the operating frequency in radians per second, and $\mu$ is a magnetic permeability of the conductor.

BRIEF DESCRIPTION OF THE DRAWINGS

FIG. 9 shows a cross-sectional view of a vehicle side transfer coil assembly with a sensor aperture added in accordance with a sample embodiment.

DETAILED DESCRIPTION OF ILLUSTRATIVE EMBODIMENTS

The wireless power transfer coil assembly and associated method described herein may be understood more readily by reference to the following detailed description taken in connection with the accompanying figures and examples, which form a part of this disclosure. It is to be understood that this description is not limited to the specific products, methods, conditions or parameters described and/or shown herein, and that the terminology used herein is for the purpose of describing particular embodiments by way of example only and is not intended to be limiting of any claimed subject matter. Similarly, any description as to a possible mechanism or mode of action or reason for improvement is meant to be illustrative only, and the subject matter described herein is not to be constrained by the correctness or incorrectness of any such suggested mechanism or mode of action or reason for improvement. Throughout this text, it is recognized that the descriptions refer both to methods and systems/software for implementing such methods.

A detailed description of illustrative embodiments will now be described with reference to FIGS. 1-10. Although this description provides a detailed example of possible implementations, it should be noted that these details are intended to be exemplary and in no way delimit the scope of the inventive subject matter.

Figure 1C:
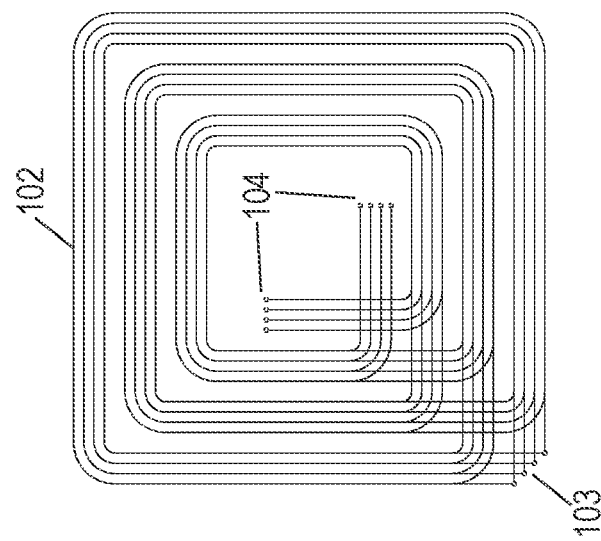
FIG. 1C shows the superimposed top side and bottom side patterns of FIGS. 1A and 1B.
Figure 1B:
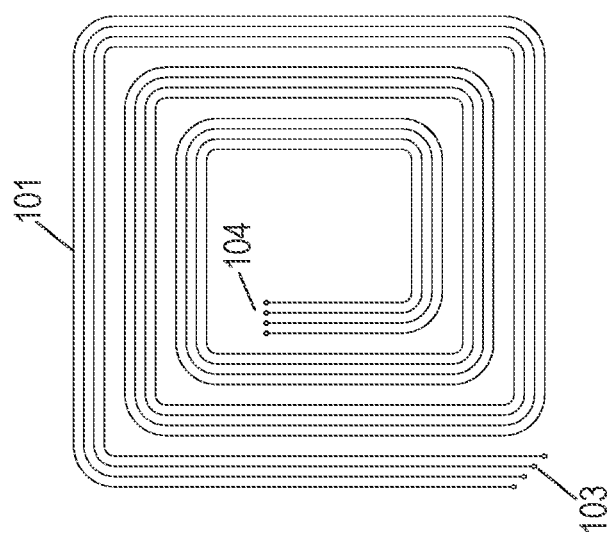
FIG. 1B shows the bottom side pattern of the resonant induction wireless power transfer coil of FIG. 1A as viewed through the top side.
Figure 1A:
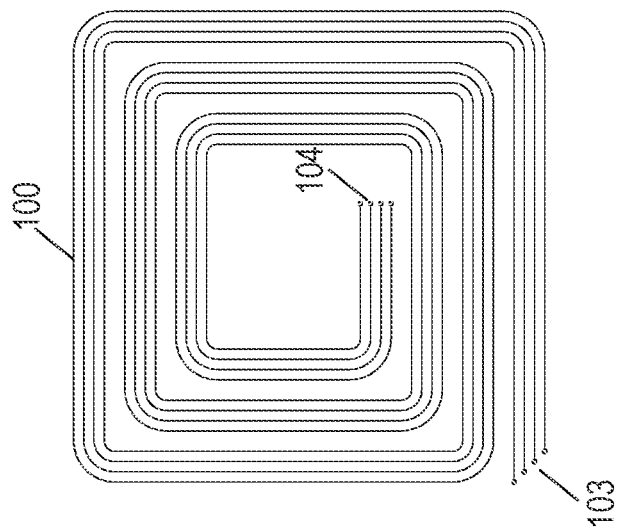
FIG. 1A shows the top side trace pattern of the resonant induction wireless power transfer coil implemented as a center-fed double sided printed circuit board in accordance with sample embodiments.

FIG. 1 is a representation of a non-self-resonating coil structure including a center-fed double sided, printed circuit board resonant induction wireless power transfer coil having 3¼ turns configured as a square, flat, planar spiral. In sample embodiments, the wireless power transfer coil has at least 2 turns. FIG. 1A shows the top side conductor pattern 100 comprised of four independent conductors, although two or more independent conductors may be used. FIG. 1B shows the bottom side conductor pattern 101 as seen looking through the printed circuit board. The bottom side conductor pattern 101 is the same as the tope side conductor pattern flipped left to right along the vertical centerline and rotated 90 degrees clockwise. It will be appreciated that the conductor patterns 100, 101 do not need to be identical and flipped. However, the top side conductor pattern 100 and bottom side conductor pattern 101 should sufficiently align to maximize magnetic flux generation by reinforcing the flux generated by each pattern by the other. FIG. 1C shows the superimposed top side and bottom side patterns 102. Plated through holes 103 (also commonly known as vias) may electrically connect the top 100 and bottom 101 trace patterns. Coil terminals 104 and associated plated through holes 103 are shown at the center of the coil 102. Connection to off board components such as coil resonating capacitors may be accomplished by means of multiple, parallel but independent conductors thereby extending the advantageous planar multiple independent conductor structure. For a self-resonating coil, terminals 104 are connected directly to power, where in the non-self-resonating coil, the terminals connect to the resonating capacitors. Also, in alternate embodiments, connection between the top and bottom layers 100, 101 may be implemented as electrical structures such as a clamp, lug, or terminal instead of the plated through holes 103.

As shown in FIG. 1C, top side conductors are placed directly over the corresponding bottom side conductors where possible as such placement allows uniform flux transmission and the top and bottom windings intercept the same flux distribution. The result is a symmetrical flat spiral inductor 102 having two layers and a total of ½ turns. Because current flows in the same direction in the top 100 and the bottom 101 sections, magnetic flux generated by the top and bottom layers is reinforced. In this example, if current is fed into the top conductor layer terminals 104, the current flow is in the clockwise direction when looking through the board from the top. Current fed into the bottom conductor layer terminals 104 results in a counter-clockwise current flow. Connecting the top and bottom spirals doubles the number of turns and increases the total inductance by a factor of four.

Figure 2C:
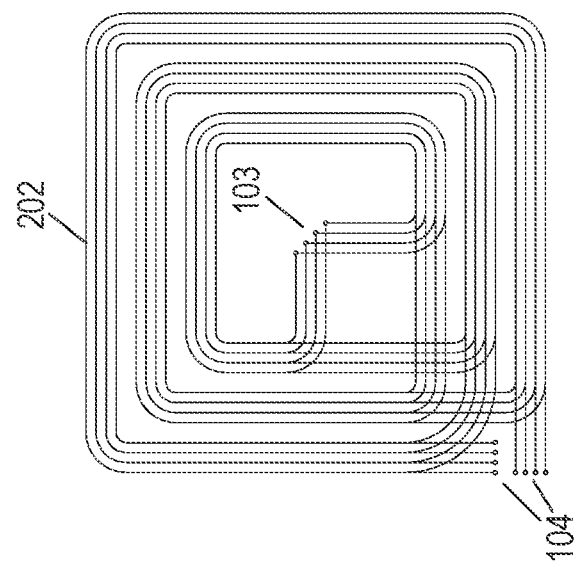
FIG. 2C shows the superimposed top side and bottom side patterns of FIGS. 2A and 2B.
Figure 2B:
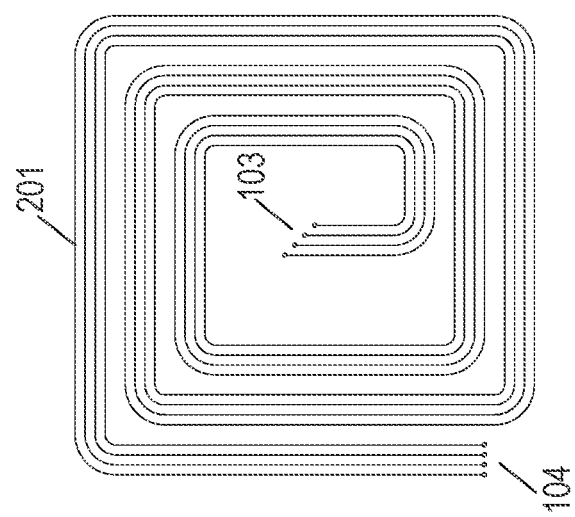
FIG. 2B shows the bottom side pattern of the resonant induction wireless power transfer coil of FIG. 2A as viewed through the top side.
Figure 2A:
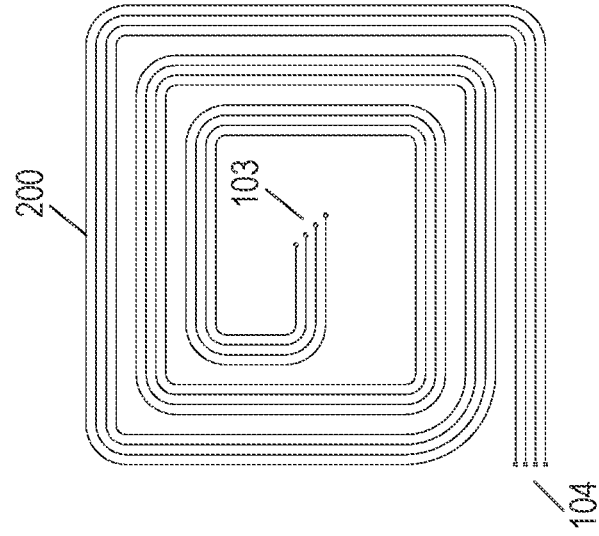
FIG. 2A shows the top side trace pattern of the resonant induction wireless power transfer coil implemented as an outer-edge fed double sided printed circuit board in accordance with sample embodiments.

FIG. 2 is an example of a non-self-resonating coil structure including an outer-edge fed, double-sided, printed circuit board, resonant induction wireless power transfer coil having 3¼ turns configured as a square, flat, planar spiral. In sample embodiments, the wireless power transfer coil has at least 2 turns. FIG. 2A shows the top side conductor pattern 200 comprised of four independent conductors, although two or more independent conductors may be used. FIG. 2B shows the bottom side conductor pattern 201 as seen looking through the printed circuit board. The bottom side conductor pattern 201 is the same as the top side conductor pattern flipped left to right along the vertical centerline and rotated 90 degrees clockwise. It will be appreciated that the conductor patterns 200, 201 do not need to be identical and flipped. FIG. 2C shows the superimposed top side and bottom side patterns 202. Plated through holes 103 (also commonly known as vias) may electrically connect the top 200 and bottom 201 trace patterns. Coil terminals and associated plated through holes 103 are shown at the outer corner of the coil 202. Connection to off board components such as coil resonating capacitors may be accomplished by means of multiple, parallel but independent conductors 104 thereby extending the advantageous planar multiple independent conductor structure. For a self-resonating coil, terminals 104 are connected directly to power, where in the non-self-resonating coil, the terminals connect to the resonating capacitors. Also, the connection between the top and bottom layers may be implemented as an electrical structure such as a clamp, lug, or terminal instead of the plated through holes 103.

As shown in FIG. 2C, top side conductors 200 are placed directly over the corresponding bottom side conductors 201 where possible as such placement allows uniform flux transmission and the top and bottom windings intercept the same flux distribution. The result is a symmetrical flat spiral inductor 202 having two layers and a total of 6½ turns. Because current flows in the same direction in the top 200 and the bottom 201 sections, magnetic flux generated by the top and bottom layers is reinforced. In this example, if current is fed into the top conductor layer terminals 104, the current flow is in the counter-clockwise direction when looking through the board from the top. Current fed into the bottom conductor layer terminals 104 results in a clockwise current flow. Connecting the top and bottom spirals doubles the number of turns and increases the total inductance by a factor of four.

In the embodiments of FIGS. 1 and 2, the number of traces operated in parallel to constitute a single winding conductor is determined by the operating frequency, the trace material conductivity, and the operating current. Narrow trace widths limit conductor eddy currents in the trace width dimensions and also maintain uniform current density across the individual trace cross-sections. Eddy current losses for a conductive element in a uniform magnetic field are $$P = \frac{\pi^2 B^2 d^2 f^2}{6\rho};$$

where B is the peak magnetic field, d is the smallest dimension of the conductive element perpendicular to the magnetic field vector, f is the operating frequency in Hz, p is the resistivity of the conductive element, and P is power dissipation per unit volume.

Trace thickness is limited by the skin depth at the operating frequency as it contributes to AC resistance. Skin depth δ at typical resonant induction wireless power frequencies is given by $\delta = \sqrt{(2\sigma/\omega\mu)}$ where is the conductor resistivity in Ohm-Meters, ω is the operating frequency in radians per second and μ is the magnetic permeability of the trace material.

The number of parallel traces is determined by the operating current and the ampacity of the trace for the specified trace cross-sectional area and environmental conditions. FIGS. 1 and 2 show embodiments using 4 parallel conductors but any number may be used. Adjacent trace-to-trace separation distance within a turn ensemble can be small, limited only by printed circuit board manufacturing design rules as trace-to-adjacent-trace voltages within the same ensemble are near zero. Turn-to-turn spacing between conductor ensembles must be sufficient to provide adequate voltage isolation between adjacent turns. Turn-to-turn voltage is proportional to the ratio of the turn diameters. The printed circuit board dielectric layer thickness should be sufficient to prohibit dielectric breakdown.

The longer outer conductors of the top side conductor pattern 200 are connected to the shorter inside conductors of the bottom side conductor pattern 201. Swapping conductors from inside to outside in this fashion equalizes conductor length and inductance. Equalized length and inductance equalizes resistance and reactance, which equalizes current distribution between conductors. Top side and bottom side conductors are superimposed. Magnetic flux flows through the inter-conductor gaps. In sample embodiments, all conductor traces are of equal length.

As will be discussed below, the two-layer structure depicted in FIGS. 1 and 2 can be extended to 2n-layers, where n is any positive integer value. The 2n-layer coil structure can be made to be self-resonating by designing the capacitance between coil layers, such that self-resonating frequency, $f_r=1 \div (2\pi\sqrt{(LC)})$, where L=equivalent coil inductance and C=equivalent capacitance of coil structure. For a self-resonating coil structure, coil terminals and plated through holes 104 are connected directly to power.

FIG. 3 is a representation of a multi-layer, multi-conductor pair, edge terminated coil. In this sample embodiment, FIG. 3 depicts an eight-layer stack up of individual coils that are roughly 3¼ to 3½ turns each. Conductor pattern 300 is the top layer (layer 1), 301 is layer 2, 302 is layer 3, 303 is layer 4, 304 is layer 5, 305 is layer 6, 306 is layer 7, and 307 is the bottom layer (layer 8). Conductor pairs 300 and 301, 302 and 303, 304 and 305, 306 and 307 follow the same criteria as depicted in FIG. 2. Coil terminals 104 of FIGS. 3A, 3C, 3E, and 3G receive input signals and coil terminals 104 of FIGS. 3B, 3D, 3F, and 3H provide output signals for a clockwise current configuration. Plated through holes 103 may comprise blind and/or buried vias that connect certain layers while isolating other layers, depending on coil configuration. It will be appreciated that the plated through holes 103 need not all fall directly on top of one another. Individual paired connections may be offset with independent plated through hole 103 patterns. An example embodiment showing offset plated through holes 103 is depicted in FIG. 3J.

Figure 3A:
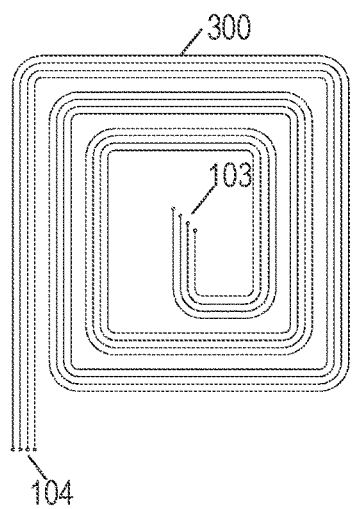
FIGS. 3A-3H show individual conductor patterns of respective layers of the resonant induction wireless power transfer coil implemented as an outer-edge terminated multi-layer, multi-conductor coil implemented as an eight-layer printed circuit board in accordance with sample embodiments as viewed through the top side.
Figure 3B:
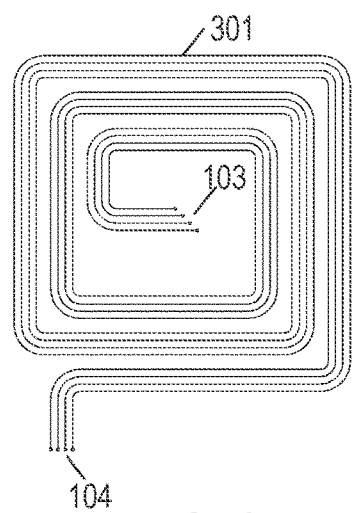
Figure 3C:
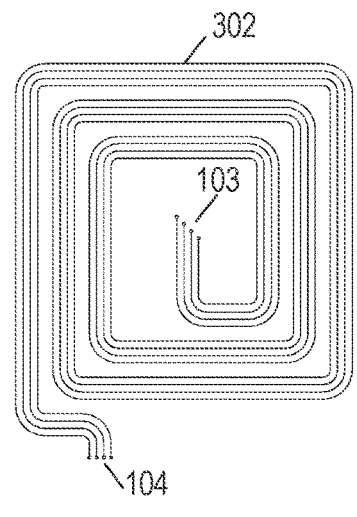
Figure 3D:
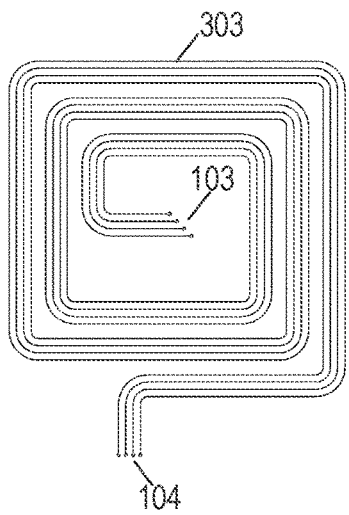
Figure 3E:
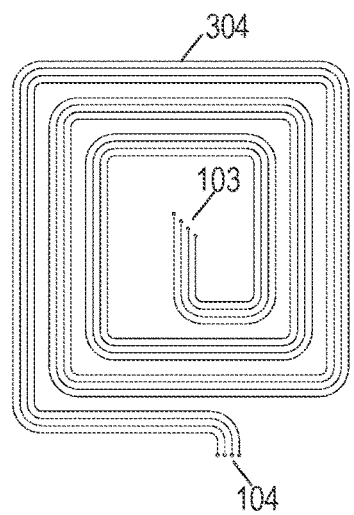
Figure 3F:
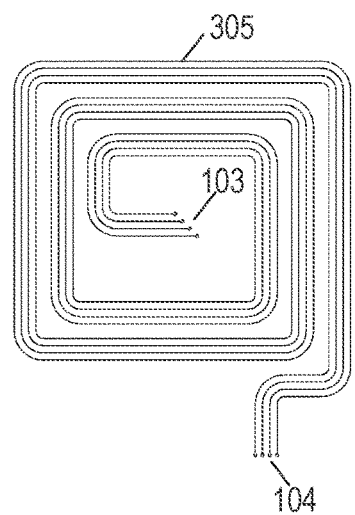
Figure 3G:
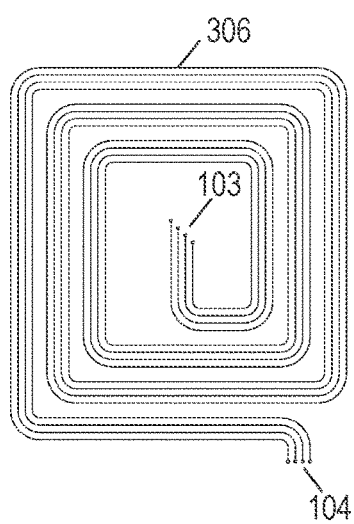
Figure 3H:
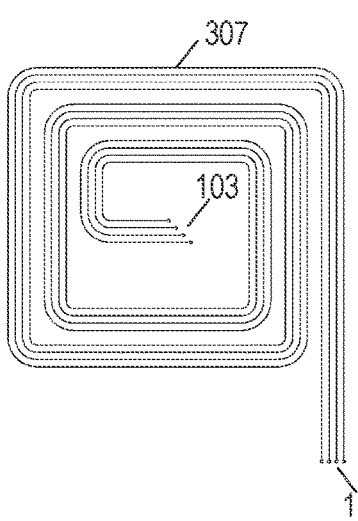
Figure 3I:
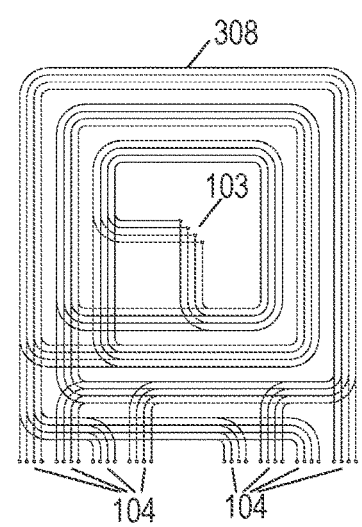
FIG. 3I shows the composite eight-layer stack of rectangular planar coils of FIGS. 3A-3H looking through the superimposed layers from the top side.
Figure 3J:
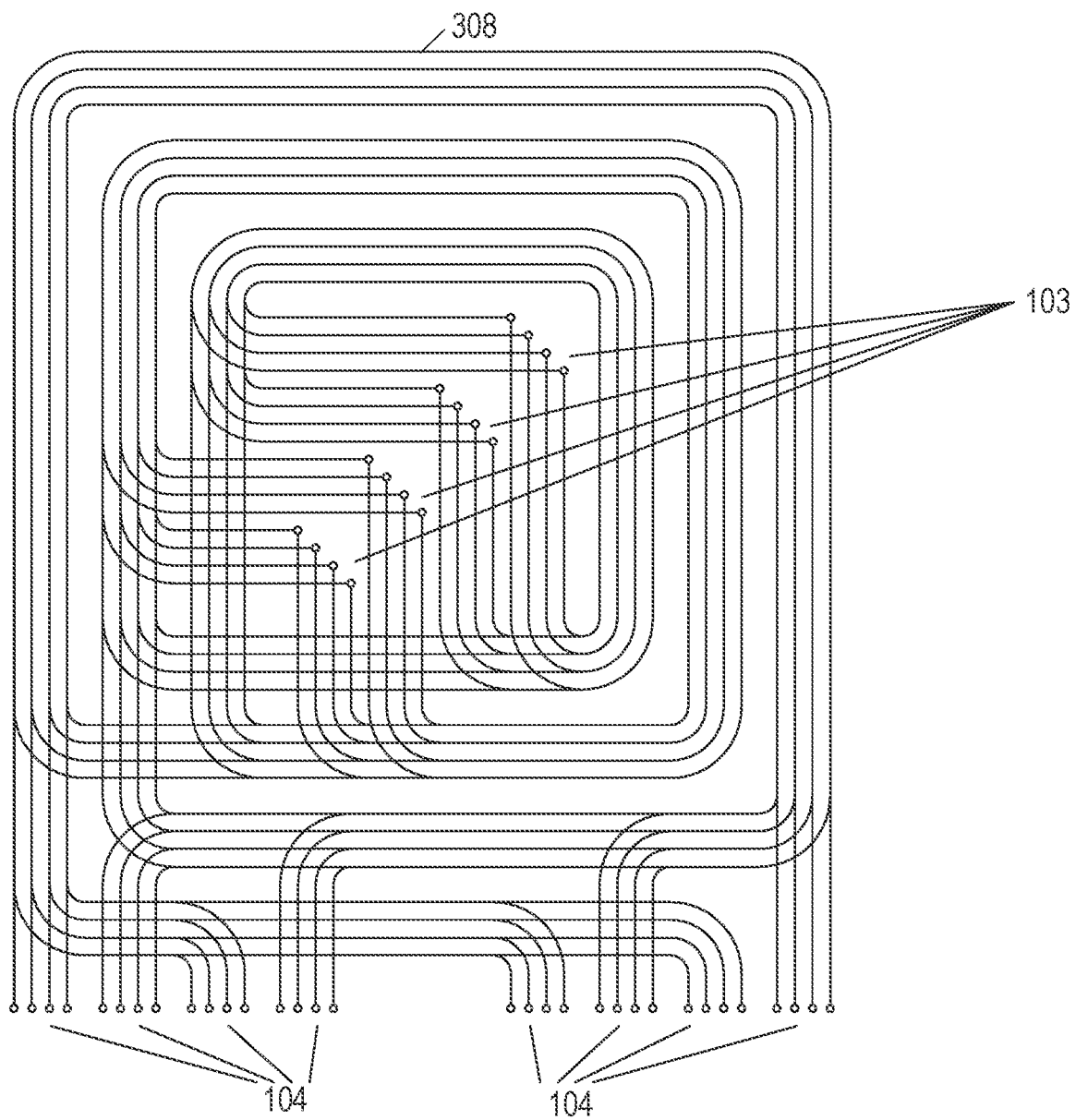
FIG. 3J shows a sample embodiment of the composite eight-layer stack of rectangular planar coils of FIGS. 3A-3H having offset plated through holes.

FIG. 3I is the composite eight-layer stack up looking through the printed circuit board or laminate assembly from the top side. Conductor pattern 308 is the superposition of patterns 300-307. In this embodiment, plated through holes 103 pass current between layers. Coil terminals 104 all lie on the outer edge of the coil assembly. In an alternative embodiment, an opening in the center of the coil structure may be provided that would allow current to be passed between layer pairs by means of an electrically conductive clamping mechanism.

It will be appreciated by those skilled in the art that the coil stack of FIG. 3 may be provided within a multi-laminated assembly that could be implemented as a printed circuit board (PCB).

FIG. 4 shows a cross-sectional view of four sample multi-layer coil stacks comprising 2n layers, where "n" can be any positive integer. The conductor patterns depicted in FIGS. 1, 2 and 3 can apply to the cross-sections depicted in FIG. 4.

Figure 4A:
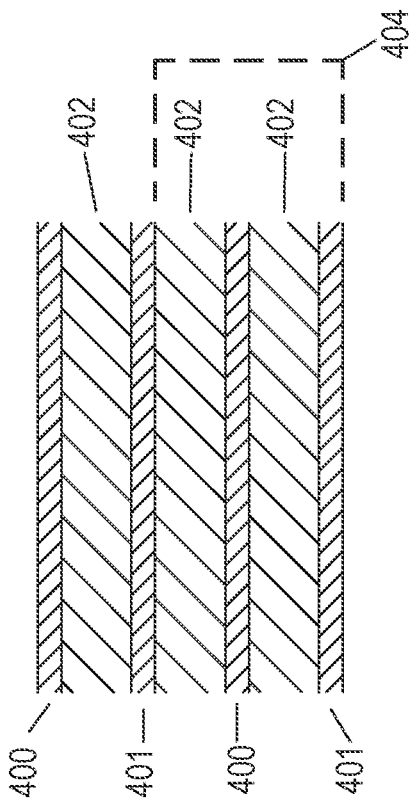
FIG. 4A shows a cross-sectional view of a sample multi-layer coil stack comprising 2n layers, where n=1.

FIG. 4A shows a basic two-layer case (n=1), where 400 is the forward current path conductor, 401 is the return current path conductor, and 402 is the differential mode dielectric.

Figure 4B:
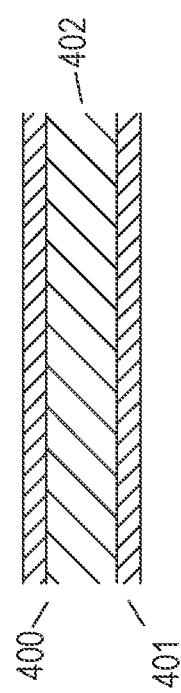
FIG. 4B shows a basic four-layer coil (n=2) having alternative forward and return current path conductors.

FIG. 4B shows the basic four-layer case (n=2), where again 400 is the forward current path conductor, 401 is the return current path conductor, and 402 is the differential mode dielectric. The embodiment of FIG. 4B is essentially a stack-up of two, two-layer panels depicted in FIG. 4A with an additional differential mode dielectric layer 402 in between. This implementation includes alternating forward and return current path conductors. To extend FIG. 4B to six layers or more (n=3+), the pattern 404 which includes a differential mode dielectric 402, forward current path conductor 400, a differential mode dielectric 402, and return current path conductor 401 is repeated.

Figure 4C:
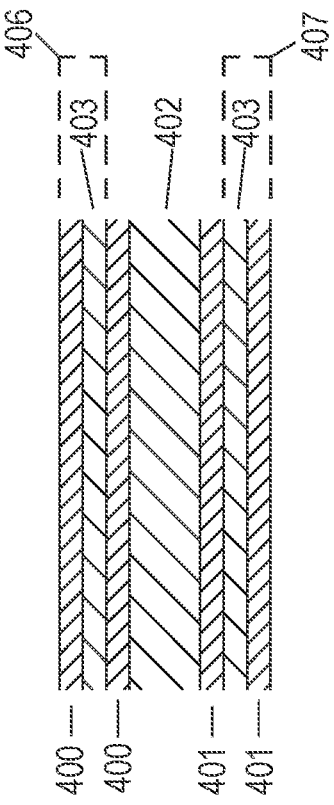
FIG. 4C shows a basic four-layer coil (n=2) having differential mode dielectrics and forward current paths on outer layers and return current paths on inner layers.

FIG. 4C shows a basic four-layer case (n=2), where again 400 is the forward current path conductor, 401 is the return current path conductor, 402 is the differential mode dielectric, and 403 is a common mode dielectric layer. This configuration is similar to FIG. 4B except that the bottom two layers are inverted, such that the forward currents travel on the top and bottom layers 400 and the return currents travel on the inner layers 401. This results in a common mode dielectric 403 since the return current path conductors 401 are electrically in parallel with one another. To extend FIG. 4C to six-layers or more (n=3+), the pattern 405 which includes a common mode dielectric 403, either a forward current path conductor 400 for n=odd or a reverse current path conductor 401 for n=even, a differential mode dielectric 402, and either a reverse current path conductor 401 for n=odd or a forward current path conductor 400 for n=even is repeated.

Figure 4D:
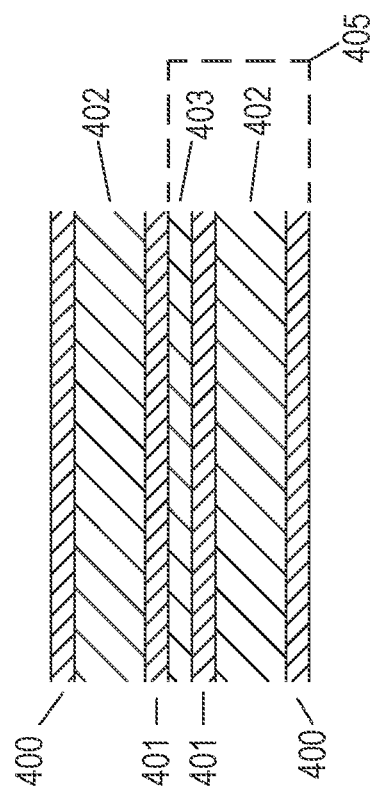
FIG. 4D shows a basic four-layer coil (n=2) having non-interleaved conductors with common mode dielectrics.

FIG. 4D shows the basic four-layer case (n=2), where again 400 is the forward current path conductor, 401 is the return current path conductor, 402 is the differential mode dielectric, and 403 is a common mode dielectric layer. This configuration is similar to FIG. 4A, except that the top and bottom layers each have an additional layer added in parallel for carrying the forward and reverse currents. This results in common mode dielectrics 403 between the top two conductors 400 and bottom two conductors 401 and one differential mode dielectric 402 in the center of the four-layer stack-up. To extend FIG. 4D to six-layers or more (n=3+), the pattern 406 on the top side, which includes a common mode dielectric 403, and a forward current path conductor 400 is repeated. Also, the pattern 407 on the bottom side, which includes a common mode dielectric 403, and a reverse current path conductor 401, is repeated.

It will be appreciated that the coil configurations of FIGS. 4A through 4D may be used in the creation of other embodiments of more coil layers. For example, six differential pairs of coil assemblies may be implemented as multiple instances and combinations of 4-layer stack-ups as depicted in FIGS. 4B, 4C, and 4D to provide a 24-layer coil design.

FIG. 5 depicts perspective views for coil stacks that may be constructed of multiple, independent, multi-layer coil implementations as shown in FIGS. 1-4.

Figure 5B:
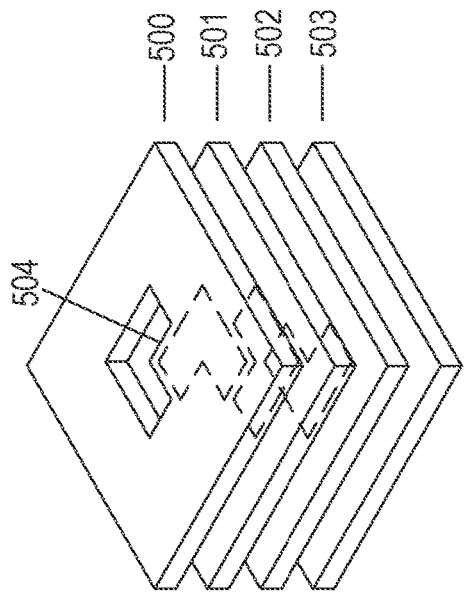
FIG. 5B shows a perspective view of a coil stack constructed of multiple, independent multi-tabbed multi-layer planar coils of the type illustrated in FIGS. 1-4 and having a center-fed termination in sample embodiments.
Figure 5A:
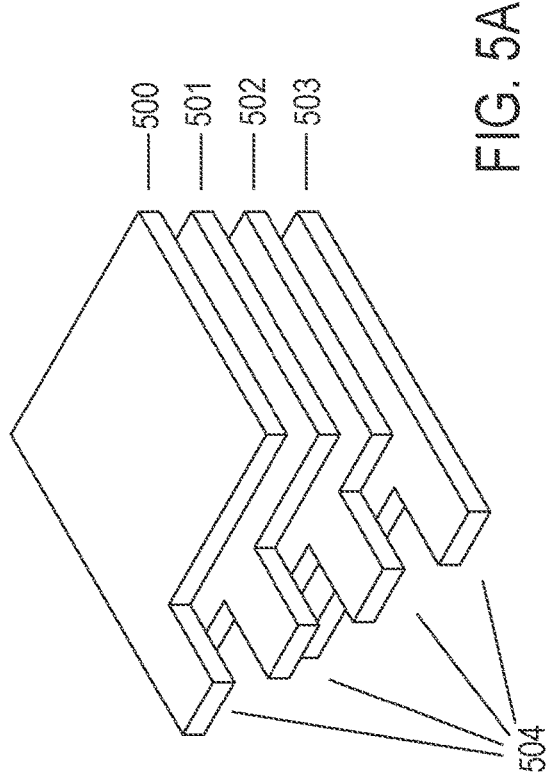
FIG. 5A shows a perspective view of a coil stack constructed of multiple, independent multi-tabbed multi-layer planar coils of the type illustrated in FIGS. 1-4 and having an outside edge termination in sample embodiments.

FIG. 5A is a physical representation of an edge-terminated coil stack that may be constructed of multiple, independent, multi-layer coil implementations as depicted in FIGS. 1-4. In the sample embodiment of FIG. 5A, four independent planar coils are provided that implement the conductor patterns of FIG. 3. Item 500 is a planar coil that includes n layers of conductor patterns 300 and 301, where n is a positive integer. Item 501 is a planar coil that includes n layers of conductor patterns 302 and 303. Item 502 is a planar coil that includes n layers of conductor patterns 304 and 305. Item 503 is a planar coil that includes n layers of conductor patterns 306 and 307. Coil terminals 504 may be implemented as independent "tabs" of planar coils 500-503 that are offset along the edge to facilitate connection to independent terminal pairs as illustrated. The signals may pass between layers using vias or terminals connecting the boards through the middle as in the embodiments illustrated in FIGS. 1-4. In the embodiment of FIG. 5A, an edge pattern, spiraling from the edge inward, is provided and the boards pass signals through vias or terminals (not shown) connecting through the middle of the respective boards.

FIG. 5B is a physical representation of a center-fed coil stack that may be constructed of multiple, independent, multi-layer coil implementations as depicted in FIGS. 1-4. In the sample embodiment of FIG. 5B, four independent planar coils are provided that implement the conductor patterns of FIG. 3. Item 500 is a planar coil that includes n layers of conductor patterns 300 and 301, wherein n is a positive integer. Item 501 is a planar coil that includes n layers of conductor patterns 302 and 303. Item 502 is a planar coil that includes n layers of conductor patterns 304 and 305. Item 503 is a planar coil that includes n layers of conductor patterns 306 and 307. Coil terminals 504 may be implemented as independent "tabs" of planar coils 500-503 that are offset along the center core to facilitate connection to independent terminal pairs as illustrated. The signals may pass between layers using vias or terminals connecting the boards through the middle as in the embodiments illustrated in FIGS. 1-4. In the embodiment of FIG. 5B, a center-fed pattern, spiraling from the center outward, is provided and the boards pass signals through vias or terminals (not shown) connecting through an outer corner of the respective boards.

Figure 5C:
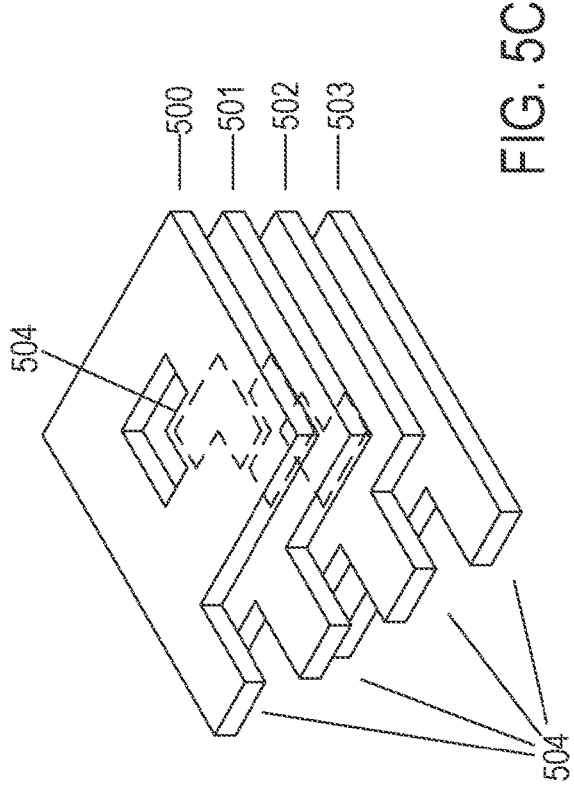
FIG. 5C shows a perspective view of a coil stack constructed of multiple, independent multi-tabbed multi-layer planar coils of the type illustrated in FIGS. 1-4 and having both outside edge and center-fed terminations in sample embodiments.

FIG. 5C is a physical representation of a coil stack that has both edge-terminations and center-terminations. Each coil stack may be constructed of multiple, independent, multi-layer coil implementations as depicted in FIGS. 1-4. In the sample embodiment of FIG. 5C, are four independent planar coils are provided that implement the conductor patterns of FIG. 3. Item 500 is a planar coil that includes n layers of conductor patterns 300 and 301, where n is a positive integer. Item 501 is a planar coil that includes n layers of conductor patterns 302 and 303. Item 502 is a planar coil that includes n layers of conductor patterns 304 and 305. Item 503 is a planar coil that includes n layers of conductor patterns 306 and 307. Coil terminals 504 may be implemented as independent "tabs" of planar coils 500-503 that are offset along the edge and along the center core to facilitate connection to independent terminal pairs as illustrated. The signals may pass between layers using vias or terminals connecting the boards through the middle as in the embodiments illustrated in FIGS. 1-4. In the embodiment of FIG. 5C, having both edge terminals and center terminals, the coil stack can be configured to be either an edge-fed or center-fed coil stack.

Utilizing multiple, independent, multi-layer coil stacks as illustrated in FIG. 5 may provide cost benefits in manufacturing where the total number of coil conductor layers is large. Rather than producing one printed circuit board of 16 to 24 layers, for example, four to six 4-layer coil stacks may be integrated into one assembly. Additional embodiments could include "m" coil stacks, wherein "m" is any positive integer greater than one (e.g., two coil stacks with two tabs or ten coil stacks with ten tabs).

FIG. 6 is the electrical form for the multi-layer, planar coil stack-ups that are depicted in FIG. 4. FIGS. 6A, 6B, 6C, 6D, and 6I are unterminated and thus do not have direct electrical connections between layers, while FIGS. 6E, 6F, 6G, 6H, and 6J are terminated and have serial and/or parallel connections between layers, depending on the configuration.

Figure 6A:
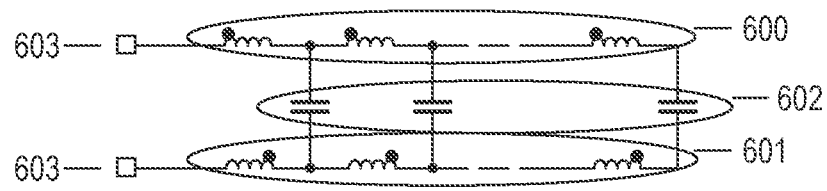
FIG. 6A shows unterminated two-layer parallel coils of a distributed lumped-element electrical representation of planar coils.

FIG. 6A is the distributed element representation of a two-layer coil with a cross-section that is depicted in FIG. 4A. The forward current path inductive elements 600 and return current path inductive elements 601 correspond to the forward current path conductor 400 and return path conductor 401, respectively. The differential mode dielectric capacitive elements 602 correlate with the differential mode dielectric 402. The coil electrical terminals are noted as 603.

Figure 6B:
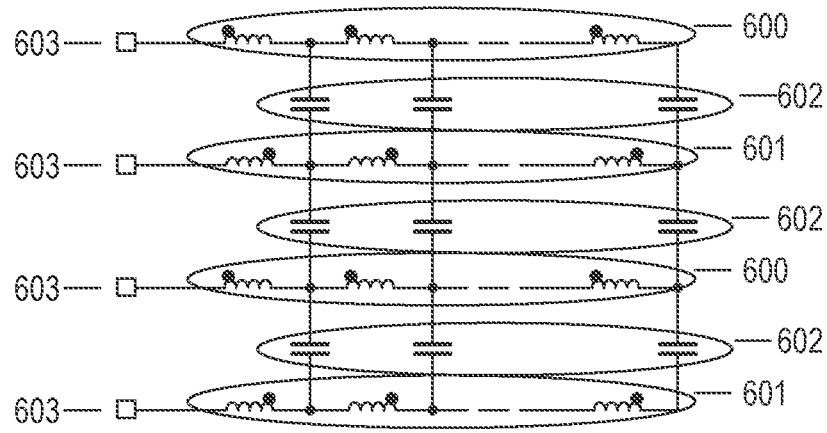
FIG. 6B shows unterminated four-layer interleaved parallel coils of a distributed lumped-element electrical representation of planar coils.

FIG. 6B is the distributed element representation of a four-layer coil scenario with a cross-section that is depicted in FIG. 4B. The forward current path inductive elements 600, return current path inductive elements 601, and differential mode dielectric capacitive elements 602 correlate with 400, 401 and 402, respectively. The coil electrical terminals are noted as 603.

Figure 6C:
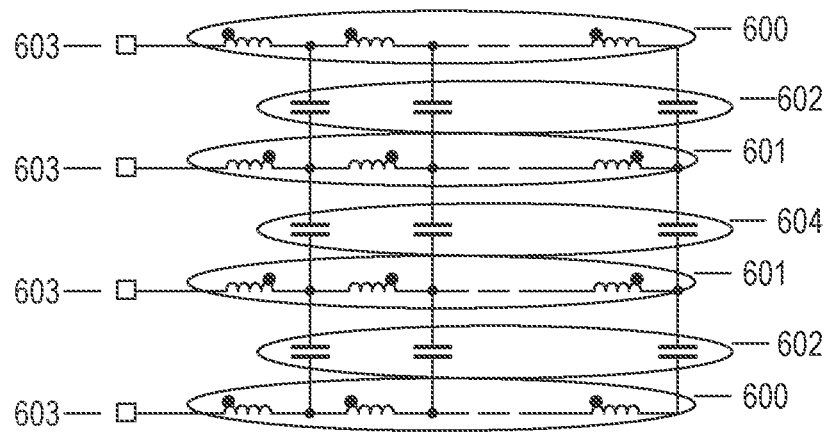
FIG. 6C shows an alternate arrangement of unterminated four-layer interleaved parallel coils of a distributed lumped-element electrical representation of planar coils.

FIG. 6C is the distributed element representation of a four-layer coil scenario with a cross-section that is depicted in FIG. 4C. The forward current path inductive elements 600, return current path inductive elements 601, and differential mode dielectric capacitive elements 602 correlate with 400, 401 and 402, respectively. The coil electrical terminals are noted as 603. This configuration is similar to FIG. 6B, except that the bottom two layers are inverted, such that the forward currents travel on the top and bottom layers 600 and the return currents travel on the inner layers 601. This results in the common mode dielectric capacitive elements 604 that correlate with the common mode dielectric 403.

Figure 6D:
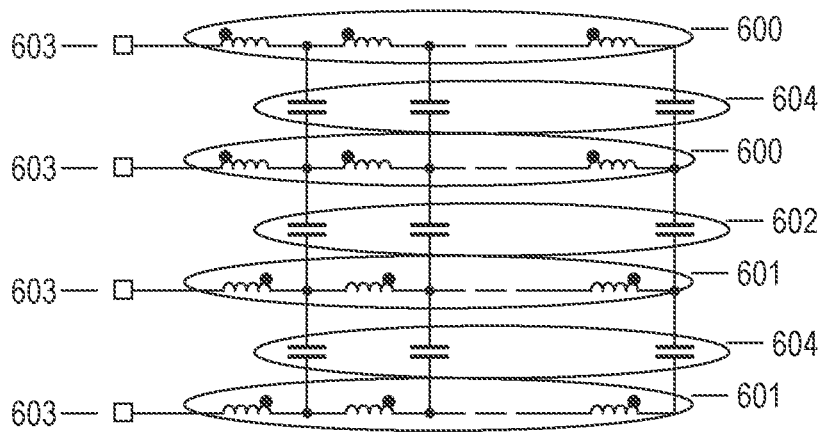
FIG. 6D shows unterminated four-layer non-interleaved parallel coils of a distributed lumped-element electrical representation of planar coils.
Figure 6E:
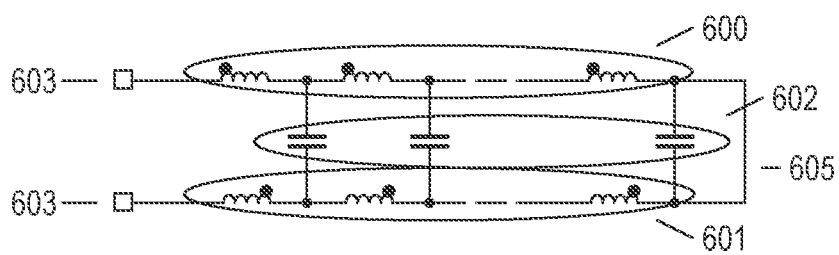
FIG. 6E shows terminated two-layer parallel coils of a distributed lumped-element electrical representation of planar coils.
Figure 6F:
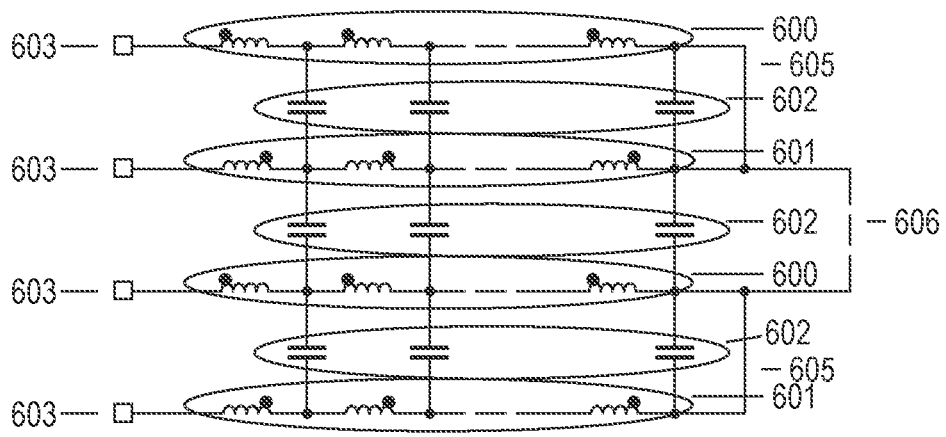
FIG. 6F shows terminated four-layer interleaved parallel coils of a distributed lumped-element electrical representation of planar coils.
Figure 6G:
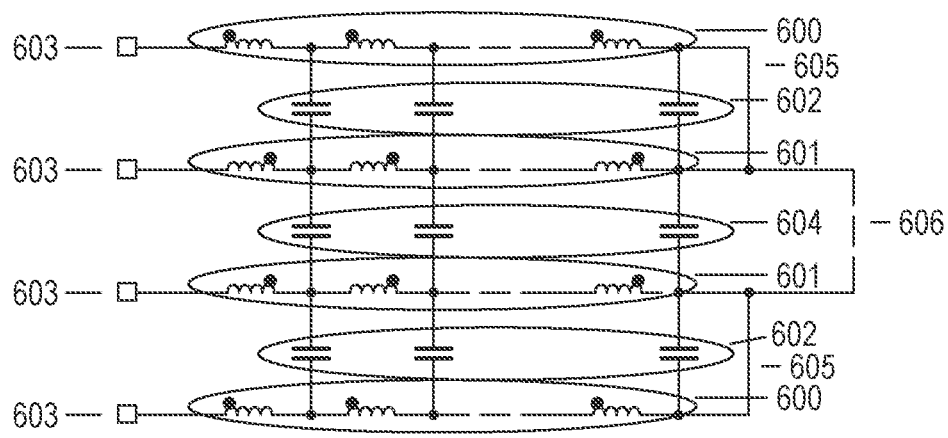
FIG. 6G shows an alternate arrangement of terminated four-layer interleaved parallel coils of a distributed lumped-element electrical representation of planar coils.
Figure 6H:
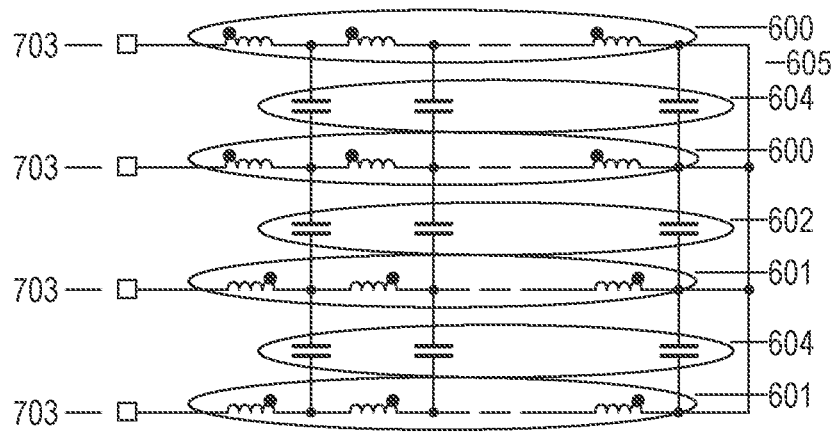
FIG. 6H shows terminated four-layer non-interleaved parallel coils of a distributed lumped-element electrical representation of planar coils.

FIG. 6D is the distributed element representation of a four-layer coil scenario with a cross-section that is depicted in FIG. 4D. This configuration is similar to FIG. 6A, except that the top and bottom layers each have an additional layer added in parallel for carrying the forward and reverse currents. The forward current path inductive elements 600, return current path inductive elements 601, and differential mode dielectric capacitive elements 602 correlate with 400, 401 and 402, respectively. The coil electrical terminals are noted as 603. The common mode dielectric capacitive elements are noted as 604.

FIGS. 6E, 6F, 6G, and 6H are identical to FIGS. 6A, 6B, 6C, and 6D, respectively, with the exception that the planar coil layers are connected to one another with a series connection of forward current path and return current path inductive elements 605. Optionally, the middle two layers in FIGS. 6F and 6G may be connected as shown by the connector 606 in dashed line. Electrically, connections 606 are not required, but they may provide benefit in manufacturing.

Figure 6I:
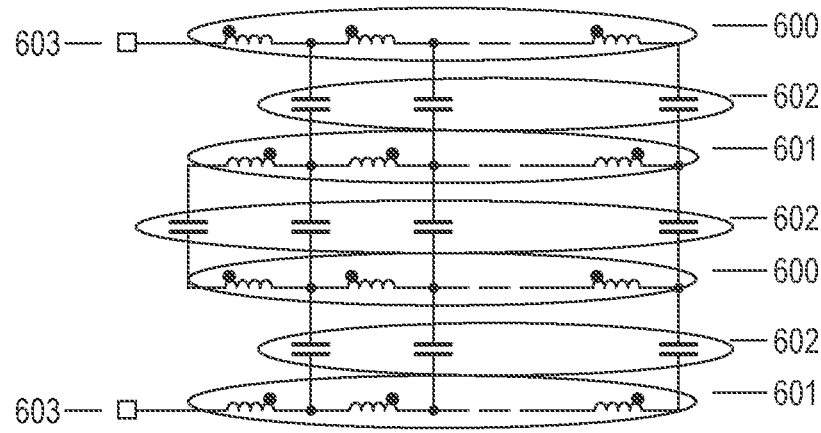
FIG. 6I shows unterminated four-layer interleaved series coils of a distributed lumped-element electrical representation of planar coils.

FIG. 6I is a distributed element representation of a four-layer interleaved coil structure that is fully series resonant and only has two terminals. This embodiment does not require plated through holes between planar coil layers as the inductive and capacitive elements create a series LC resonance.

Figure 6J:
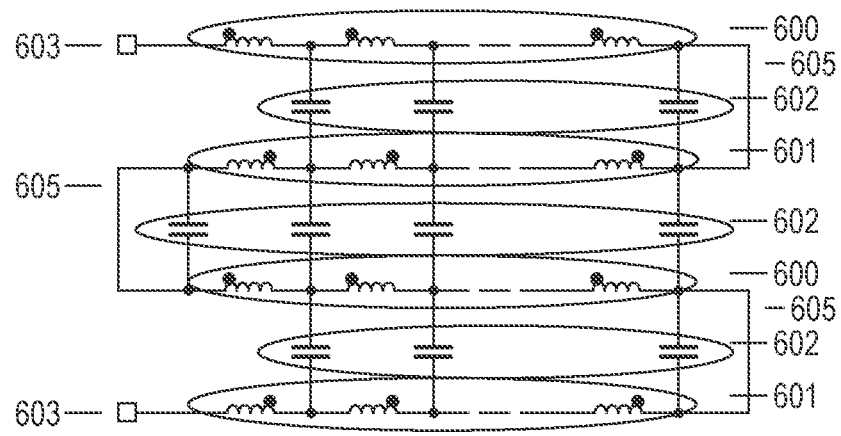
FIG. 6J shows terminated four-layer interleaved series coils of a distributed lumped-element electrical representation of planar coils.

FIG. 6J is a distributed element representation of a four-layer interleaved coil structure that is fully parallel resonant and only has two terminals. This embodiment does incorporate plated through holes that serially connect the inductive elements from layer 1 to layer 2 to layer 3 and then to layer 4. This structure results in a parallel resonance from the series inductive elements and the parallel capacitance between coil windings.

Figure 7:
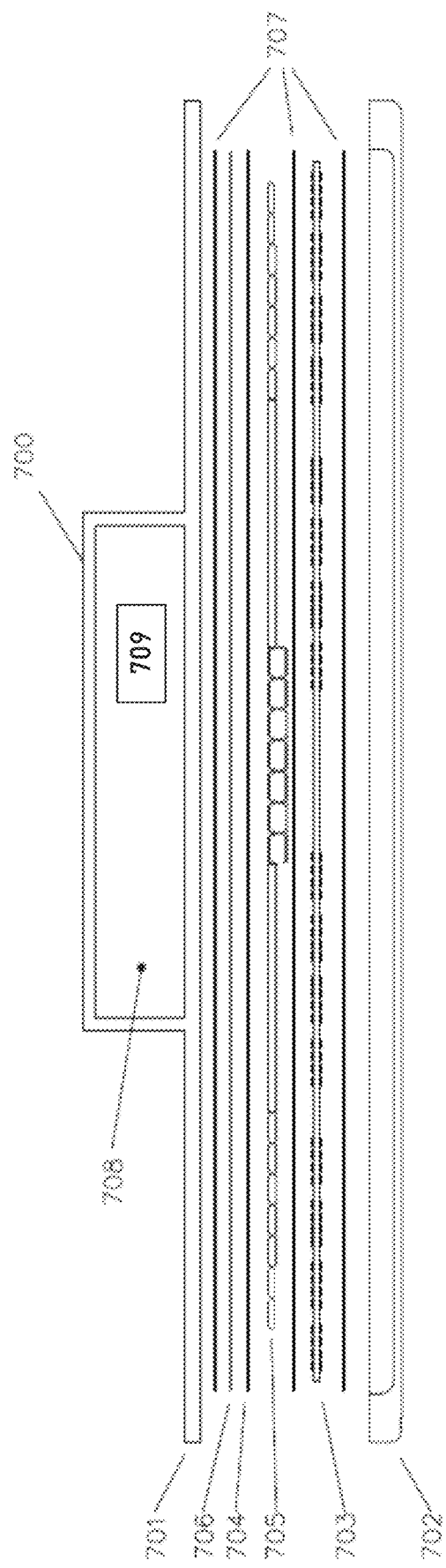
FIG. 7 shows a cross-sectional view of a vehicle side transfer coil assembly in accordance with a sample embodiment.

FIG. 7 is a cross-sectional representation of a vehicle side transfer coil assembly 700 in accordance with a sample embodiment. The transfer coil assembly 700 is contained within an environmentally sealed enclosure including the coil assembly cover 701 and the coil assembly enclosure 702. The printed circuit board containing the coil conductors of FIGS. 1A-1C is indicated by 703. Directly above coil conductors 703 is the ferrite backing layer 704, a non-conductive adhesive sheet, tape, film or cloth bonded to the ferrite which holds the ferrite bars or tiles together as a single assembly. Flux density is strongest at the center of the coil assembly. Ferrite layer spatial density as well as ferrite thickness must be adequate to avoid saturation. Because flux intensity decreases towards the coil perimeter, ferrite layer spatial density and/or thickness can be thinned while still avoiding saturation. Ferrite layer thinning is desirable as a means of reducing transfer coil weight and cost. In a sample embodiment, the ferrite layer 705 is implemented as an array of ferrite bars or plates having constant thickness. The array tiling is continuous or near continuous at the center of the coil. Tiling density is thickest in the center as illustrated in FIG. 7 and is reduced progressively as the perimeter is approached. The ferrite layer tiling has gaps as required to allow protrusion of the coil terminal conductors and other protrusions or penetrations as required.

In a sample embodiment, the ferrite bar tiling 705 and ferrite backing layer 704 are replaced with a single composite magnetic structure including ferrite powder combined with a binding material such as a thermoplastic or resin and possibly additional substances such as thermally conductive, electrically insulating powder to improve thermal conductivity, injection molded or otherwise shaped to final or near final form. Magnetic flux is most intense in the center of the transfer coil 703 diminishing towards the perimeter. This means the composite ferrite layer 705 can be thicker at the center where the flux is the most intense to avoid ferrite material saturation and thinner at the perimeter to reduce weight and material cost. Material composition can vary spatially to tailor thermal and magnetic properties as a function of location. Passages for cooling fluid can be included where and as required.

An eddy current shield 706 is implemented as an electrically conductive sheet or layer that intercepts and dissipates the residual magnetic flux not diverted by the ferrite layer 705. Eddy current shield 706 can be a metallic plate providing structural strength to the transfer coil assembly 700. Non-ferrous metals with relative permeability near one are preferred in this use on order to avoid disturbance of the flux steering action of the ferrite layer 705. Alternatively, the eddy current shield 706 can be a conductive film deposited on a dielectric substrate. The eddy current shield 706 can also be integrated into the coil assembly enclosure by attaching the eddy current shield 706 to the inside surface of the enclosure 702 or by making the enclosure from aluminum.

Layers 707 are mechanically conformal, electrically non-conductive layers providing mechanical support, heat removal by means of thermal conductivity and physical spacing for the conductor printed circuit board 703 and the ferrite flux steering layer 705. The ferrite flux steering layer 705 should not be in contact or in near contact of the conductor printed circuit board 703 or the eddy current shield 706 in order to avoid excessive proximity effect resistive losses in the former and excessive eddy current losses in the latter. The spacing layers 707 can be made of conventional elastomeric compression pads used as gap fillers between heat generating circuitry and heat removal surfaces. Alternatively, spacing layers 707 can be implemented as open cell foam material infused with a heat conductive liquid such as mineral oil. Improved cooling flow is obtained by placing holes or slots as needed in the spacing layers 707. On the conductor printed circuit board 703, slots are placed between conductor traces or between turns to preserve conductor continuity. The coil assembly cover 701 also may include a separate enclosed volume 708 containing other system components 709 such as resonating capacitors, rectifiers, post-rectification ripple filter components, control, communications, foreign object and living object detection circuitry, and interface electronics.

In FIG. 7, the printed circuit board 703 is double-sided with conductive traces on the top and bottom sides but having no inter-layers. Multiple printed circuit boards or a multi-layer printed circuit board can be used with the turns connected in parallel to increase ampacity or in series to increase inductance.

Figure 8A:
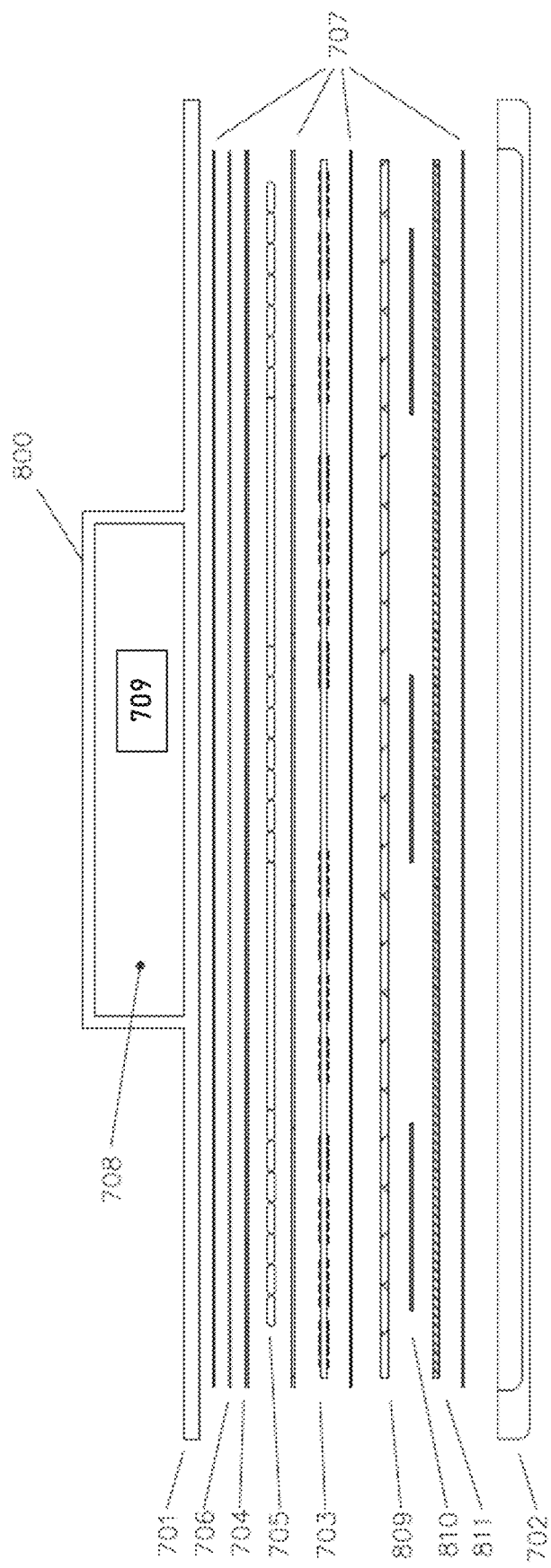
FIG. 8A shows a cross-sectional view of a vehicle side transfer coil assembly in accordance with an alternative embodiment.
Figure 8B:
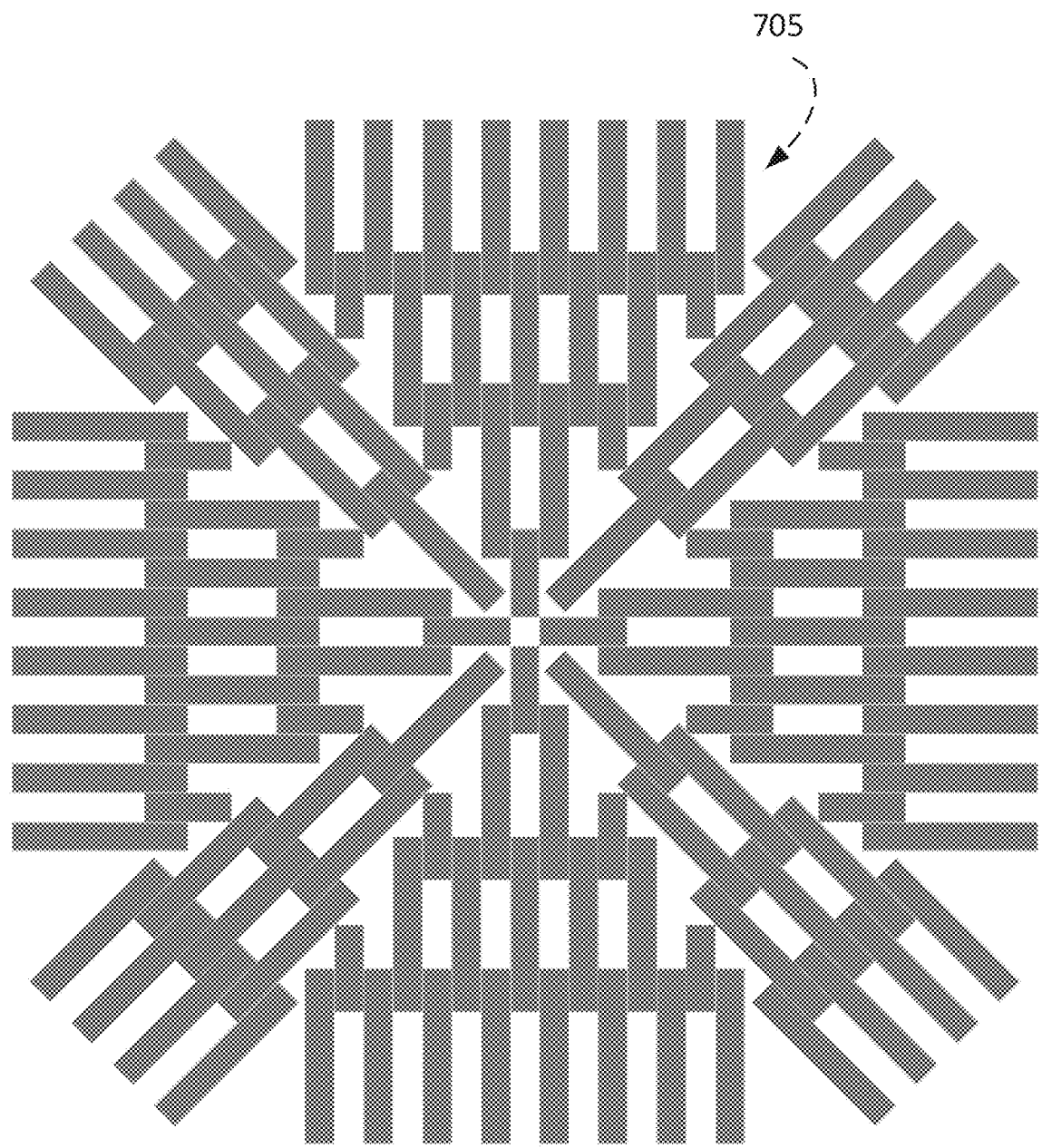
FIG. 8B is a top view of a sample ferrite layer of the transfer coil assembly.

FIG. 8A is a cross-sectional representation of a vehicle-side transfer coil assembly 800 in accordance with an alternative embodiment, and FIG. 8B is a top view of a sample ferrite layer 705 of the transfer coil assembly 800. Additional printed circuit boards or layers can be included as needed to implement transfer coil alignment, near field communications, foreign object/living object detection, or E-field faraday shielding functions. The resonating capacitor can be implemented as a printed circuit board containing an array of surface mount capacitors, the multiple capacitors allowing increased capacitance, and voltage rating. Alternatively, the resonating capacitors can be physically realized as a thin, multi-layer, metalized dielectric sheet implemented as an additional layer located between the ferrite layer 705 and the coil assembly enclosure 702. In FIG. 8A, an object detection PCB 809, ferrite isolation layer 810, and communication PCB 811 are shown between the conductor printed circuit board 703 and the coil assembly enclosure 702. The coil assembly cover 701 may include a separate enclosed volume 708 containing other system components 709 such as resonating capacitors, rectifiers, post-rectification ripple filter components, control, communications, foreign object and living object detection circuitry, and interface electronics. In yet another embodiment, the resonating capacitors may be realized as thin, large area metalized dielectric films located in the transfer coil assembly 800 on the low field intensity side of the ferrite layer 705.

In an alternative embodiment, a flat spiral of conductive tape or strip replaces the printed circuit board 703. The tape or strip is placed with the width dimension parallel to the incident magnetic flux in order to minimize eddy currents across the face of the conductor. In order to minimize eddy currents in the thickness dimension, the thickness of the conductive tape or strip is limited to be no thicker than four times the skin depth in the trace conductor at the operating frequency. Non-conductive spacers maintain separation between adjacent spiral turns. The conductive tape or strip conductors are otherwise uninsulated in order to not hinder heat removal. Increased tape or strip width increases conductor ampacity. Tape or strip spirals can be stacked vertically for printed circuit conductors to increase ampacity when wired in parallel, or to increase inductance when wired in series.

Those skilled in the art will appreciate that the ground side transfer coil layers can be identical to the vehicle side coil to improve manufacturing efficiencies. FIG. 9 is a sample embodiment of a vehicle transfer coil assembly with a sensor aperture 900 added. Sensor electronics 901 look into aperture conduit 902, which terminates with sensor conduit endcap 903.

Commercial resonant induction wireless power equipment typically requires ancillary systems to meet current and expected regulatory requirements. These ancillary systems include coil alignment error detection, communications, foreign object detection, and living object detection all of which are best located at the geometry center of the transfer coil active face. However, the center of the active face has high magnetic flux amplitude prohibiting placement of wiring and electronic circuity at that location.

FIG. 9 shows the transfer coil assembly 700 previously shown in FIG. 7 with a centrally located sensor aperture 900. This aperture 900 running through the thickness dimension of the transfer coil assembly allows the bi-directional passage of sensor or communications signals from the high magnetic flux intensity front face of the transfer coil assembly through to the low magnetic flux intensity region inside the enclosure volume 708. The sensor electronics 901 inside the enclosure volume 708 can be optical, optical image, optical video, ultrasonic, as well as microwave, millimeter wave or terahertz wave electromagnetic energy. Components designated as 902 and 903 are the aperture conduit and aperture endcap, respectively. Implantation of the aperture conduit and endcap depends upon the sensor modality. For optical sensors and communications, the conduit can be a non-conductive empty tube, a transparent light pipe, or a spatially coherent or non-coherent fiber optics bundle. The endcap 903 provides an environmental seal with the transfer coil enclosure 702 but can also include an optical lens such as a wide angle or fisheye lens. The conduit 902 can include optical components such as a lens as well. Non-electrically conductive materials are preferred to avoid eddy current generation. For ultrasonic sensor or communications modality, the sensor conduit is an acoustic waveguide. The endcap 903 provides an environmental seal as before and can include an acoustic lens or diffuser.

For electromagnetic sensor modality, the sensor conductor is an electromagnetic waveguide or transmission line structure. Conventional metallic waveguide or transmission line structures such as stripline transmission line are not suitable due to eddy current generation in the intense magnetic field. Such structures can be made suitable by substituting high-pass or band-pass frequency selective surfaces for the continuous metallic surfaces present in conventional waveguide or transmission line structures. Alternatively, the conduit transmission line can be implemented as a Goubau single wire transmission line with the launcher located on the low magnetic intensity side of the ferrite layer, or with the launcher constructed from frequency selective instead of continuous metallic surfaces. In a sample embodiment, the electromagnetic waveguide is implemented as a conventional dielectric waveguide including a high dielectric constant core surrounded by a low dielectric constant medium. The endcap 903 provides an environmental seal that can include a dielectric or artificial dielectric lens. Through use of a flexible printed circuit board for the winding layer 703 and small ferrite tile size or the use of a flexible or non-planar composite ferrite layer 705 the transfer coil assembly can be made conformal to a non-planar surface such as a cylinder for ease of mechanical fit, for reduced aerodynamic or hydrodynamic drag or for placement on a vehicle or object having cylindrical or other non-planar form such as underwater autonomous vehicles, artillery shells or similar objects.

Figure 10:
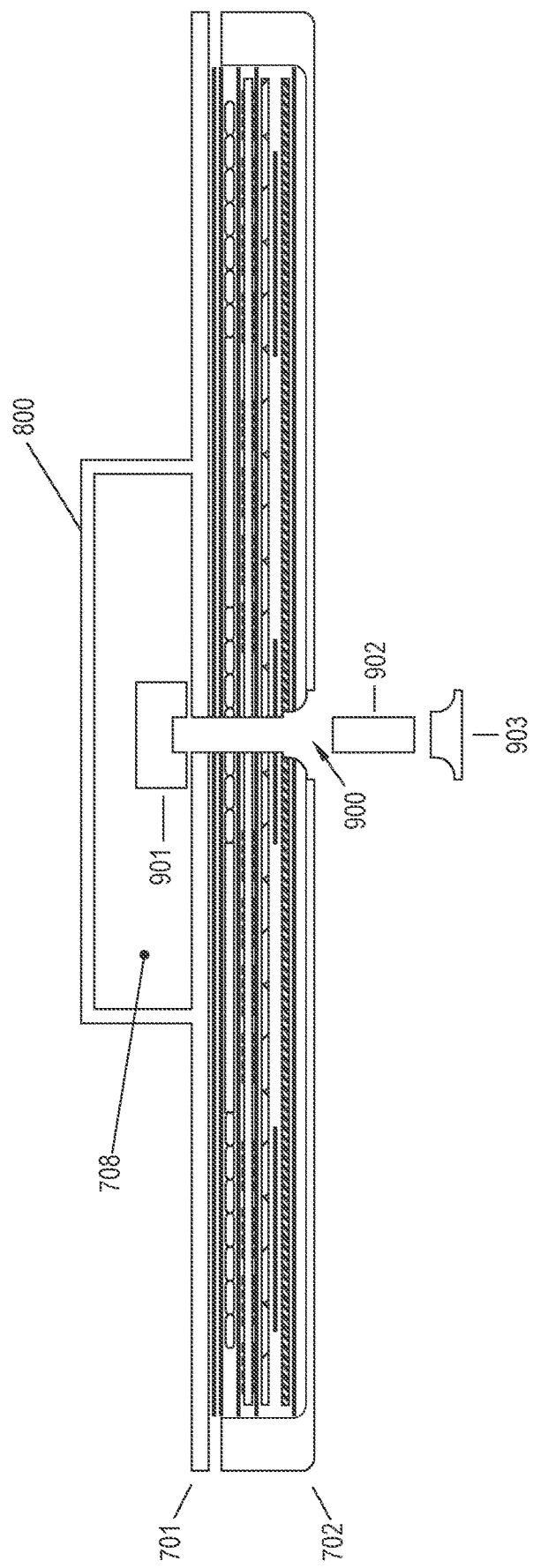
FIG. 10 shows a cross-sectional view of a vehicle side transfer coil assembly with a sensor aperture added in accordance with an alternative embodiment.

FIG. 10 is a cross-sectional representation of a vehicle side transfer coil assembly 800 with a sensor aperture added in accordance with an alternative embodiment. As in the embodiment of FIG. 8, additional printed circuit boards or layers can be included as needed to implement transfer coil alignment, near-field communications, foreign object/living object detection, or E-field faraday shielding functions. In FIG. 10, as in the embodiment of FIG. 8, an object detection PCB 809, ferrite isolation layer 810, and communication PCB 811 are provided between the conductor printed circuit board 703 and the coil assembly enclosure 702.

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

What is claimed:

1. A resonant induction wireless power transfer coil comprising:
a 2n-layer interleaved coil stack, where n is a positive integer and n≥2, at least one layer of the coil stack being interleaved with at least one other layer of the coil stack, at least one layer of the coil stack including:
a dielectric having a first side and a second side,
a first conductor pattern comprising a first plurality of conductors wound in a spiral on the first side of the dielectric to provide a forward current path conductor, and
a second conductor pattern comprising a second plurality of conductors wound in a spiral on the second side of the dielectric to provide a return path conductor, the second conductor pattern being aligned with the first conductor pattern whereby the second conductor pattern reinforces magnetic flux generated by the first conductor pattern,
wherein the first and second conductor patterns are connected whereby the dielectric operates in a differential mode to generate capacitance,
wherein the first and second conductor patterns are placed relative to one another so as to provide flux transmission in a same direction and to provide a designed capacitance across the 2n-layer interleaved coil stack, and
wherein the designed capacitance is selected such that the 2n-layer interleaved coil stack and the designed capacitance together self-resonate at a predetermined wireless power transfer operating frequency $f_r=1\div(2\pi\sqrt{(LC)})$ that is being used for wireless power transfer with another wireless power coil of a wireless power transfer apparatus, where L=equivalent coil inductance of the 2n-layer interleaved coil stack and C=the designed capacitance of the 2n-layer interleaved coil stack.

2. The wireless power transfer coil as in claim 1, wherein the 2n-layer interleaved coil stack comprises a printed circuit board, further comprising at least one plated offset throughhole through the printed circuit board electrically connecting at least one of first conductor patterns of respective layers or second conductor patterns of respective layers.

3. The wireless power transfer coil as in claim 1, further comprising at least one electrical connection between the first conductor pattern and the second conductor pattern comprising a terminal.

4. The wireless power transfer coil as in claim 1, wherein the first and second conductor patterns comprise at least two turns of conductor configured as a square, flat planar spiral.

5. The wireless power transfer coil as in claim 1, wherein the first and second plurality of conductors each comprises at least two independent conductors.

6. The wireless power transfer coil as in claim 2, further comprising coil terminals and associated throughholes in the center of the first and second conductor patterns or at an outer edge of the first and second conductor patterns and an outer edge of the printed circuit board.

7. The wireless power transfer coil as in claim 1, wherein n=2, the 2n-layer interleaved coil stack respectively comprising the first conductor pattern providing a first forward current path conductor, the second conductor pattern providing a first return current path conductor, a third conductor pattern providing a second forward current path conductor, and a fourth conductor pattern providing a second return current path conductor, further comprising a second dielectric provided between the second conductor pattern and the third conductor pattern wherein the second and third conductor patterns are connected whereby the second dielectric operates in a differential mode to generate addition capacitance, and a third dielectric provided between the third conductor pattern and the fourth conductor pattern wherein the third and fourth conductor patterns are connected whereby the third dielectric operates in a differential mode to generate additional capacitance.

8. The wireless power transfer coil as in claim 1, wherein n=2, the 2n-layer interleaved coil stack respectively comprising the first conductor pattern providing a first forward current path conductor, the second conductor pattern providing a first return current path conductor, a third conductor pattern providing a second return current path conductor, and a fourth conductor pattern providing a second forward current path conductor, further comprising a second dielectric provided between the second conductor pattern and the third conductor pattern wherein the second and third conductor patterns are connected whereby the second dielectric operates in a common mode, and a third dielectric provided between the third conductor pattern and the fourth conductor pattern wherein the third and fourth conductor patterns are connected whereby the third dielectric operates in a differential mode to generate additional capacitance.

9. The wireless power transfer coil as in claim 1, wherein n=2, the 2n-layer interleaved coil stack respectively comprising a third conductor pattern comprising a first forward path conductor, the first conductor pattern providing a second forward current path conductor, the second conductor pattern providing a first return current path conductor, an a fourth conductor pattern providing a second return current path conductor, further comprising a second dielectric provided between the third conductor pattern and the first conductor pattern wherein the third and first conductor patterns are connected whereby the second dielectric operates in a common mode, and a third dielectric provided between the second conductor pattern and the fourth conductor pattern wherein the second and fourth conductor patterns are connected whereby the third dielectric operates in a common mode.

10. The wireless power transfer coil as in claim 1, wherein the 2n-layer interleaved coil stack comprises a plurality of printed circuit boards and further comprises terminals implemented as independent tabs offset along an edge or middle of each printed circuit board and vias or second terminals connecting respective printed circuit boards through the middle or the edge of respective printed circuit boards.

11. A wireless power transfer coil assembly comprising:
an enclosure;
the wireless power transfer coil of claim 1;
a ferrite layer; and
an eddy current shield,
wherein the wireless power transfer coil, ferrite layer, and eddy current shield are disposed in parallel within the enclosure.

12. The wireless power transfer coil as in claim 1, wherein the first conductor pattern comprises a flat spiral of conductive tape and the second conductor pattern is the same as the first conductor pattern except flipped left to right along a vertical centerline and rotated 90°, further comprising:
at least one electrical connection electrically connecting respective conductors of the first and second conductor patterns,
whereby the first and second conductor patterns are placed relative to one another so as to provide flux transmission in a same direction and whereby a thickness of the conductive tape is no thicker than four times a skin depth of the first conductor pattern at a predetermined wireless power operating frequency, where skin depth $\delta$ at the predetermined wireless power operating frequency is given by $\delta=\sqrt{2\sigma/\omega\mu}$ where $\sigma$ is a conductor resistivity in Ohm-Meters, $\omega$ is the predetermined wireless power operating frequency in radians per second, and $\mu$ is a magnetic permeability of the conductor.

13. The wireless power transfer coil as in claim 1, wherein the predetermined wireless power transfer operating frequency $f_r$ is at least 20 kHz and is adapted to wirelessly charge an electric vehicle.

14. A resonant induction wireless power transfer coil assembly comprising:
an enclosure;
a resonant induction wireless power transfer coil within the enclosure comprising:
a dielectric having a first side and a second side,
a first conductor pattern comprising a first plurality of conductors wound in a spiral on the first side of the dielectric to provide a forward current path conductor, and
a second conductor pattern comprising a second plurality of conductors wound in a spiral on the second side of the dielectric to provide a return current path conductor, the second conductor pattern being aligned with the first conductor pattern whereby the second conductor pattern reinforces magnetic flux generated by the first conductor pattern, wherein the first and second conductors are connected whereby the dielectric operates in a differential mode to generate capacitance and wherein the first and second conductor patterns are placed relative to one another so as to provide flux transmission in a same direction;
a ferrite layer adjacent the wireless power transfer coil, the ferrite layer comprising ferrite bars, tiles, or plates arrayed with an array tiling having at least one of a spatial density or thickness that is adequate to avoid saturation of the ferrite layer by a flux intensity at a center of the wireless power transfer coil and that has at least one of a spatial density or thickness that reduces progressively with flux intensity of the wireless power transfer coil approaching a perimeter of the wireless power transfer coil while avoiding saturation of the ferrite layer by the flux intensity of the wireless power transfer coil; and
an eddy current shield,
wherein the wireless power transfer coil, ferrite layer, and eddy current shield are disposed in parallel within the enclosure.

15. The wireless power transfer coil assembly as in claim 14, wherein the eddy current shield comprises an electrically conductive sheet or a conductive film deposited on a dielectric substrate that is adapted to intercept and dissipate residual magnetic flux not diverted by the ferrite layer.

16. The wireless power transfer coil assembly as in claim 14, further comprising electrically non-conductive layers disposed between the enclosure and the wireless power transfer coil, between the wireless power transfer coil and the ferrite layer, and between the ferrite layer and the eddy current shield, the electrically non-conductive layers adapted to provide mechanical support, heat removal, and physical spacing for the wireless power transfer coil and the ferrite layer.

17. The wireless power transfer coil assembly as in claim 14, wherein the enclosure includes an enclosed volume containing at least one of power control, communication, or sensor electronics including circuitry adapted to provide object detection functions, and the enclosed volume further includes resonating capacitors in the form of a thin, multilayer, metalized dielectric sheet implemented as an additional layer located between the ferrite layer and the enclosure or resonating capacitors in the form of thin, large area metalized dielectric films located on a low field intensity side of the ferrite layer.

18. The wireless power transfer coil assembly as in claim 14, further comprising a second resonant induction wireless power transfer coil within the enclosure that is stacked and connected in parallel with the resonant induction wireless power transfer coil so as to increase winding ampacity or stacked and connected in series with the resonant induction wireless power transfer coil so as to increase winding inductance.

19. The wireless power transfer coil assembly as in claim 14, further comprising a sensor aperture located at a center of the wireless power transfer coil, the sensor aperture including sensor electronics and allowing for bi-directional passage of sensor or communications signals to/from respective sides of the wireless power transfer coil assembly, the sensor electronics including a light pipe, acoustic waveguide, electromagnetic waveguide, or dielectric waveguide for sensing and communications, wherein the electromagnetic waveguide has high-pass or bandpass frequency selective surfaces adapted to avoid the generation of eddy currents, and the dielectric waveguide is implemented as a single wire Goubau transmission line that is adapted to avoid eddy current generation.

20. The wireless power transfer coil assembly as in claim 14, wherein the first conductor pattern comprises a flat spiral of conductive tape and the second conductor pattern is the same as the first conductor pattern except flipped left to right along a vertical centerline and rotated 90°, further comprising:

at least one electrical connection electrically connecting respective conductors of the first and second conductor patterns, whereby the first and second conductor patterns are placed relative to one another so as to provide flux transmission in a same direction and whereby a thickness of the conductive tape is no thicker than four times a skin depth of the first conductor pattern at a predetermined wireless power operating frequency, where skin depth $\delta$ at the predetermined wireless power operating frequency is given by $\delta=\sqrt{2\sigma/\omega\mu}$ where $\sigma$ is a conductor resistivity in Ohm-Meters, $\omega$ is the predetermined wireless power operating frequency in radians per second, and $\mu$ is a magnetic permeability of the conductor.

* * * * *